(12) United States Patent
Canzonieri et al.

(10) Patent No.: US 11,650,373 B2
(45) Date of Patent: May 16, 2023

(54) PITCH CONVERSION APPARATUS FOR USE WITH OPTICAL FIBERS

(71) Applicant: CommScope Technologies LLC, Hickory, NC (US)

(72) Inventors: Paige E. Canzonieri, Brooklyn Park, MN (US); Jaime Gonzalez Batista, Prior Lake, MN (US); Scott L. Carlson, Bloomington, MN (US)

(73) Assignee: CommScope Technologies LLC, Hickory, NC (US)

( * ) Notice: Subject to any disclaimer, the term of this patent is extended or adjusted under 35 U.S.C. 154(b) by 17 days.

(21) Appl. No.: 17/209,512

(22) Filed: Mar. 23, 2021

(65) Prior Publication Data

US 2021/0302661 A1    Sep. 30, 2021

Related U.S. Application Data

(60) Provisional application No. 62/993,976, filed on Mar. 24, 2020, provisional application No. 62/993,966, filed on Mar. 24, 2020.

(51) Int. Cl.
*G02B 6/36* (2006.01)
*G02B 6/38* (2006.01)
(Continued)

(52) U.S. Cl.
CPC ............ *G02B 6/3652* (2013.01); *G02B 6/30* (2013.01); *G02B 6/3885* (2013.01); *G02B 6/4471* (2013.01)

(58) Field of Classification Search
CPC ...... G02B 6/3652; G02B 6/30; G02B 6/3885; G02B 6/4471; G02B 6/2555; G02B 6/448
See application file for complete search history.

(56) References Cited

U.S. PATENT DOCUMENTS 5,252,050 A    10/1993  Zimmer
5,290,389 A     3/1994  Shupe et al.
(Continued)

FOREIGN PATENT DOCUMENTS

EP    0 640 855 A1    3/1995
EP    2 770 357 A1    8/2014
(Continued)

OTHER PUBLICATIONS

Extended European Search Report for corresponding European Patent Application No. 17876746.3, dated Jun. 12, 2020, 7 pages.
(Continued)

*Primary Examiner* — Michael P Mooney
(74) *Attorney, Agent, or Firm* — Merchant & Gould P.C.

(57) ABSTRACT

Aspects and techniques of the present disclosure relate to an apparatus for providing 200 micron, or smaller, coated optical fibers with a 250 micrometer pitch diameter in preparation for insertion into a Multi-fiber Push On connector (MPO) and/or splicing apparatus. The apparatus can sort, arrange, and clamp optical fibers into a proper sequence to allow the coated optical fibers to be aligned for processing, for example, connectorization and/or splicing. The apparatus includes a separator element that defines grooves for receiving and sequencing coated optical fibers with respect to each other to set a uniform pitch diameter.

11 Claims, 18 Drawing Sheets

(51) Int. Cl.
*G02B 6/44* (2006.01)
*G02B 6/30* (2006.01)

(56) References Cited

U.S. PATENT DOCUMENTS

| | | | |
|---|---|---|---|
| 5,524,167 | A | 6/1996 | Ewert et al. |
| 5,685,945 | A | 11/1997 | Mock et al. |
| 5,829,659 | A | 11/1998 | Mansfield et al. |
| 6,337,943 | B1 | 1/2002 | Dumitriu |
| 6,442,318 | B1 | 8/2002 | Goldman |
| 6,598,497 | B1 | 7/2003 | Mizushi et al. |
| 6,655,433 | B1 | 12/2003 | Hirayama et al. |
| 7,400,810 | B2 | 7/2008 | Tanaka et al. |
| 7,418,180 | B2 | 8/2008 | Conrad et al. |
| 7,502,542 | B2 | 3/2009 | Fujisawa et al. |
| 8,032,003 | B2 | 10/2011 | Childers et al. |
| 8,052,334 | B2 | 11/2011 | Childers et al. |
| 8,485,735 | B2 | 7/2013 | Childers et al. |
| 9,128,214 | B2 | 9/2015 | Wakjira et al. |
| 9,151,896 | B2 | 10/2015 | Nguyen et al. |
| 9,541,710 | B2 | 1/2017 | Sasaki et al. |
| 10,185,089 | B2 | 1/2019 | Burke et al. |
| 11,231,553 | B2 | 1/2022 | Childers et al. |
| 2003/0091293 | A1* | 5/2003 | Murata ............... G02B 6/3801 385/80 |
| 2003/0194194 | A1 | 10/2003 | Akiyama |
| 2003/0198454 | A1 | 10/2003 | Chiang et al. |
| 2004/0055161 | A1 | 3/2004 | Chiang et al. |
| 2005/0201697 | A1 | 9/2005 | Tanaka et al. |
| 2006/0008224 | A1 | 1/2006 | Shimizu et al. |
| 2006/0088249 | A1* | 4/2006 | Takeda ............... G02B 6/30 385/71 |
| 2015/0063766 | A1 | 3/2015 | Chen |
| 2016/0011389 | A1 | 1/2016 | Ly et al. |
| 2016/0018593 | A1 | 1/2016 | Tasker et al. |
| 2016/0124150 | A1 | 5/2016 | James et al. |
| 2018/0074261 | A1* | 3/2018 | Burek ............... G02B 6/25 |

FOREIGN PATENT DOCUMENTS

| | | |
|---|---|---|
| JP | 2002-365484 A | 12/2002 |
| JP | 2010-33010 A | 2/2010 |
| JP | 2012-103341 A | 5/2012 |
| JP | 5-162645 B2 | 12/2012 |

OTHER PUBLICATIONS

US Conec, "200 μm Fiber Ribbonization to 250 μm Pitch", 6 pages (Jan. 2019).
US Conec, "Tool, Fiber Ribbonizing", C8040, 1 page (Sep. 2005).
CommScope, "200 μm -> 250 μm Ribbonizer", 1 page (2018).
Fujikura Ltd, "Fiber Holder FH-50 series", 1 page (Nov. 2014).
"Fiber Arrangement Tools", 1 page (Feb. 2019).
Ellis, R., High Fiber Count Cable Miniaturization using SMF-28® Ultra 200 Fiber, Corning Incorporated, 4 pages (2015).
OFS Fitel, LLC, "200-Micron Single-Mode Fiber Enables New Cable Designs", 7 pages (2014).
International Search Report and Written Opinion of the International Searching Authority for corresponding International Patent Application No. PCT/US2017/064247 dated Apr. 19, 2018, 12 pages.

* cited by examiner

PITCH CONVERSION APPARATUS FOR USE WITH OPTICAL FIBERS

CROSS-REFERENCE TO RELATED APPLICATIONS

This application claims the benefit of U.S. Patent Application Ser. No. 62/993,976, filed Mar. 24, 2020, and claims the benefit of U.S. Patent Application Ser. No. 62/993,966, filed Mar. 24, 2020, the disclosures of which are incorporated herein by reference in their entireties.

TECHNICAL FIELD

The present disclosure relates generally to fiber optic cables and optical fiber communication systems. More particularly, the present disclosure relates to a pitch conversion apparatus and methods used to produce a pitch diameter for terminating optical fibers to a multi-fiber ferrule and/or for splicing.

BACKGROUND

Optical ribbon fibers are commonly used with multi-fiber connectors such as the MT type ferrule and connector. The ends of ribbon fibers may be furcated and each individual fiber or pair of fibers terminated in a respective connector. Single-mode optical fibers can have a geometry that includes a central core size between 8-10 micrometers in outer diameter, a cladding layer with an outer diameter of 125 micrometers, and a coating layer with an outer diameter of 250 micrometers. Currently, 12-Fiber MT/MPO ferrules can only be used with optical fibers that are 250 micrometers in outer diameter.

In more recent years, a new generation of optical fibers with a smaller micron coating dimension have become available. Although optical fibers with a smaller micron coating dimension can have little or no impact on single fiber connectors, the smaller micron coating dimension can impact the spacing of the optical fibers and how they are joined in a splice apparatus or MPO connector.

Hence, there is a need for a device and method that can produce a 250 micrometer pitch diameter for optical fibers with a coating diameter smaller than 250 micrometers.

SUMMARY

Current processing techniques rely on an optical fiber having a 250 micrometer coating diameter in order to produce the required 250 micrometer pitch diameter needed for termination to a MPO connector and/or for splicing. In certain approaches, optical fibers have been put in manageable units to arrange the optical fibers in linear arrays in preparation for insertion into fiber optic ferrules.

One aspect of the present disclosure relates to a pitch conversion apparatus that can properly align and sequence optical fibers that have a smaller coating diameter in preparation for further processing, for example, connectorization and/or splicing. The pitch conversion apparatus can be designed to provide a 200 micrometer, or smaller, coated optical fiber with a 250 micrometer pitch diameter by providing a 50 micrometer spacing between the 200 micrometer, or smaller, coated optical fibers.

Another aspect of the present disclosure relates to a pitch conversion apparatus for aligning a plurality of optical fibers for use with a multi-fiber connector that has a 250 micrometer pitch diameter. The pitch conversion apparatus can include a base member that has a first end and a second end. The base member can include a separator mounting location adjacent the first end. The base member can define a recess in a top surface thereof.

The pitch conversion apparatus can also include a separator element positioned at the separator mounting location of the base member. The separator element can define grooves to receive and sequence the plurality of optical fibers with respect to each other such that the plurality of optical fibers have a pitch diameter.

The pitch conversion apparatus can further include a fiber holder positioned in the recess of the base member. The fiber holder can include a clamp and a channel for receiving the plurality of optical fibers extending from the separator element. The plurality of optical fibers respectively positioned in the grooves of the separator element interface with the fiber holder such that when the clamp is rotated to a closed position, the clamp maintains the proper alignment of sequenced optical fibers extending from the separator element.

Another aspect of the present disclosure relates to a pitch conversion apparatus for aligning a plurality of optical fibers for use with a multi-fiber connector that has a 250 micrometer pitch diameter. The pitch conversion apparatus can include a base member that has a first end and a second end. The base member can include a separator mounting location adjacent the first end and the base member can define a recess in a top surface thereof.

The pitch conversion apparatus can also include a metal pin positioned at the separator mounting location of the base member. The metal pin can define grooves to receive and sequence the plurality of optical fibers with respect to each other such that the plurality of optical fibers have a pitch diameter.

The pitch conversion apparatus can further include a fiber holder positioned in the recess of the base member. The fiber holder can include a clamp and a channel for receiving the plurality of optical fibers extending from the metal pin. The plurality of optical fibers respectively positioned in the grooves of the metal pin interface with the fiber holder such that the clamp maintains the proper alignment of sequenced optical fibers extending from the metal pin when the clamp is rotated to a closed position.

A further aspect of the present disclosure relates to a method of using a pitch conversion apparatus for converting 200 micrometer, or smaller, coated optical fibers to a 250 micrometer pitch diameter.

The method can include the steps of: placing a fiber holder within a recess of a base member; rotating a clamp of the fiber holder to an open position; mounting the 200 micrometer, or smaller, coated optical fibers within the a fiber holding segment of the base member and a fiber recess region of the fiber holder; and separating the 200 micrometer, or smaller, coated optical fibers.

The step of separating the 200 micrometer, or smaller, coated optical fibers can include inserting the 200 micrometer, or smaller, coated optical fibers into grooves of a separator element to sequence the 200 micrometer, or smaller, coated optical fibers. The separator element can be adapted to convert the 200 micrometer, or smaller, coated optical fibers to a 250 micrometer pitch diameter.

In certain examples, the method can further include a step of trapping the 200 micrometer, or smaller, coated optical fibers under a clip pin to retain a sequenced alignment.

In certain examples, the method can include a step of rotating the clamp to a closed position to lock the 200 micrometer, or smaller, coated optical fibers within the fiber recess region.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The present disclosure relates to an advantageous apparatus for providing 200 micron, or smaller, coated optical fibers with a 250 micrometer pitch diameter in preparation for insertion into a Multi-fiber Push On connector (MPO) and/or splicing apparatus, such as a mass fusion splicing machine. The apparatus can sort, arrange, and clamp optical fibers into a proper sequence to allow the optical fibers to be aligned for processing or connectorization. One advantageous functionality of the apparatus negates the need to "ribbonize" fibers for the MPO connectorization or splicing process. Ribbonizing can be costly and slow in the MPO connectorization or splicing process.

In certain examples, the optical fibers in accordance with the present disclosure may be mechanically bounded (i.e., linked, coupled, secured, etc.) together by a binding material (i.e., a matrix material, a substrate material, etc.) for processing or connectorization. In one example, the optical fibers may be rollable ribbon optical fibers that are not loose (e.g., free, unattached). To form rollable ribbons, individual fibers are partially bonded to each other at intermittent points.

A fiber optic cable typically includes: (1) a core comprising a plurality of optical fibers; (2) a buffer layer that surrounds the optical fiber; (3) a plurality of reinforcing members loosely surrounding the buffer layer; and (4) an outer jacket. The optical fibers can each comprise a core made of a glass or plastic material, a thin glass or plastic cladding layer formed on a peripheral surface of the core, and a plastic coating layer formed on the plastic cladding layer.

The optical fibers can include a coating layer that surrounds a bare glass portion. In one example, the coating layer can have a cladding layer having an outer diameter ranging from 120-130 microns and a core having a diameter ranging from 5-15 microns. Larger cores are possible.

Figure 1:
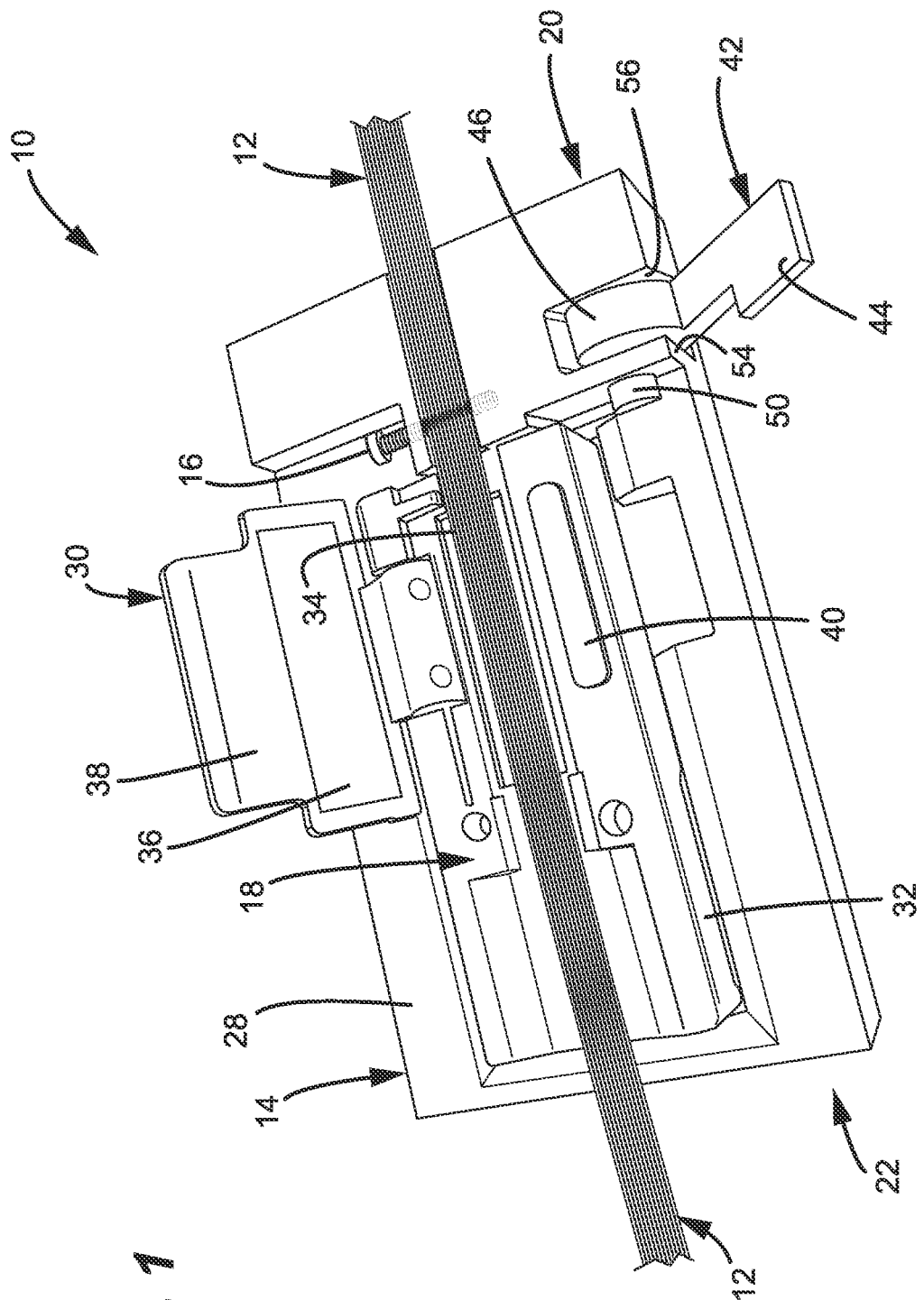
FIG. 1 is a perspective view of a pitch conversion apparatus including a base member, a separator element, and a fiber holder in accordance with the principles of the present disclosure, a clamp of the fiber holder and a clip pin of the base member are shown in an open position.
Figure 2:
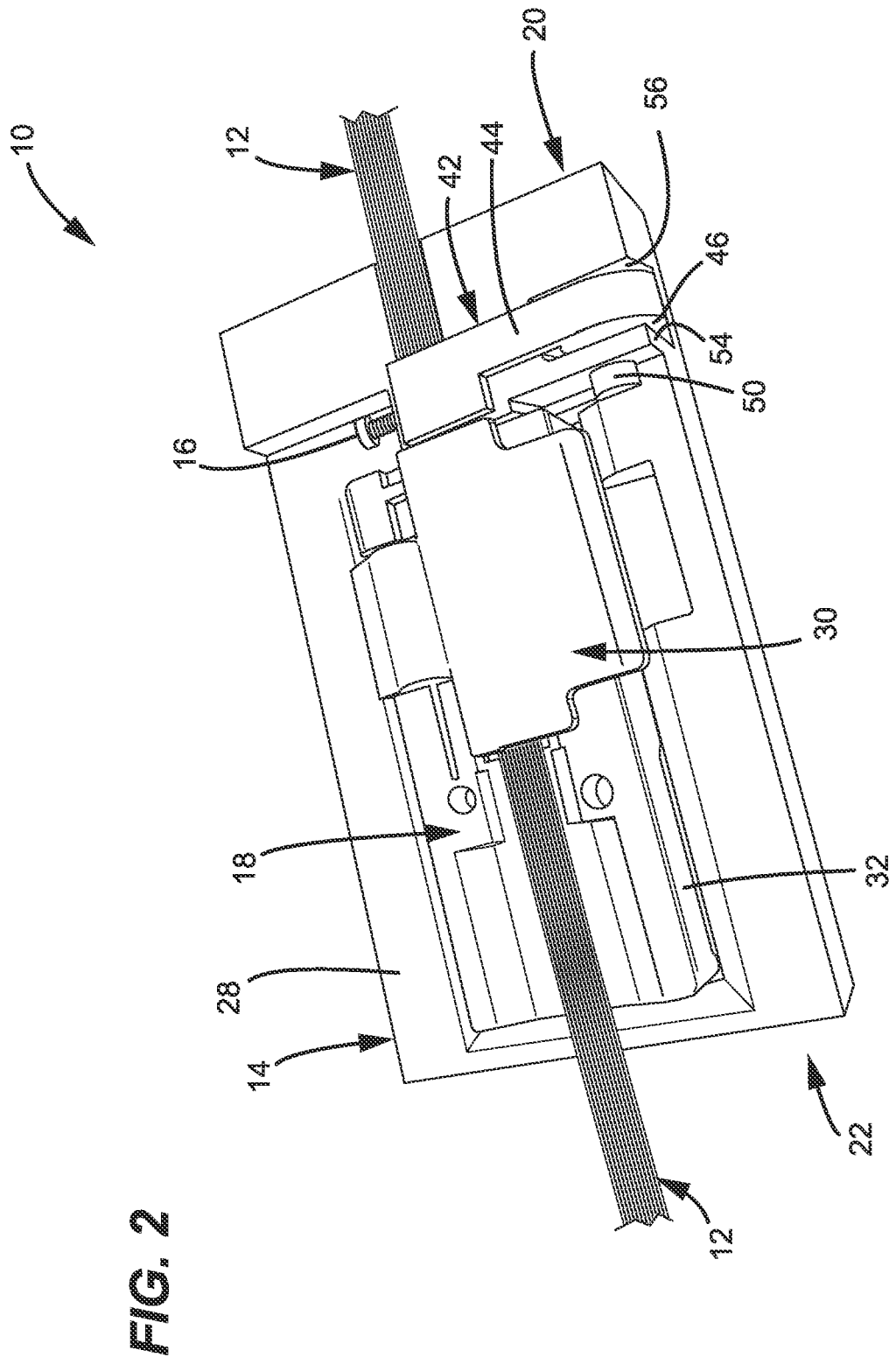
FIG. 2 is a perspective view of the pitch conversion apparatus of FIG. 1 showing the clamp of the fiber holder and the clip pin of the base member in a closed position.

Referring to FIGS. 1-2, a pitch conversion apparatus 10 is depicted that can be utilized to convert a plurality of coated optical fibers 12 that have a 200 micrometer coating diameter to a 250 micrometer pitch diameter in preparation for use with a multi-fiber connector and/or for splicing in accordance with the principles of the present disclosure. The pitch conversion apparatus 10 can be configured for receiving and sequencing the coated optical fibers 12 (e.g., 12 optical fibers) of a fiber optic cable relative to one another for preparation.

The coated optical fibers 12 can be arranged and configured as a rollable optical fiber ribbon in which the 200 micron, or smaller, coated optical fibers 12 are mechanically bounded together by a binding material. In certain examples, the binding material can be webs of polymer material coupled between outer layers of adjacent optical fibers. In certain examples, the webs can be discontinuous and run in a lengthwise direction along a length of the optical fibers.

The structure of the rollable optical fiber ribbon helps with separating and identifying optical fibers and for splicing. The optical fibers can be presented flat and in order, so no ordering of fiber is necessary to prepare for a splice or for termination. The fiber pitch of the rollable ribbon of the 200 micron fibers is therefore smaller and not compatible with a 250 micron cable, MPO connectors, and mass fusion splicers.

Figure 3:
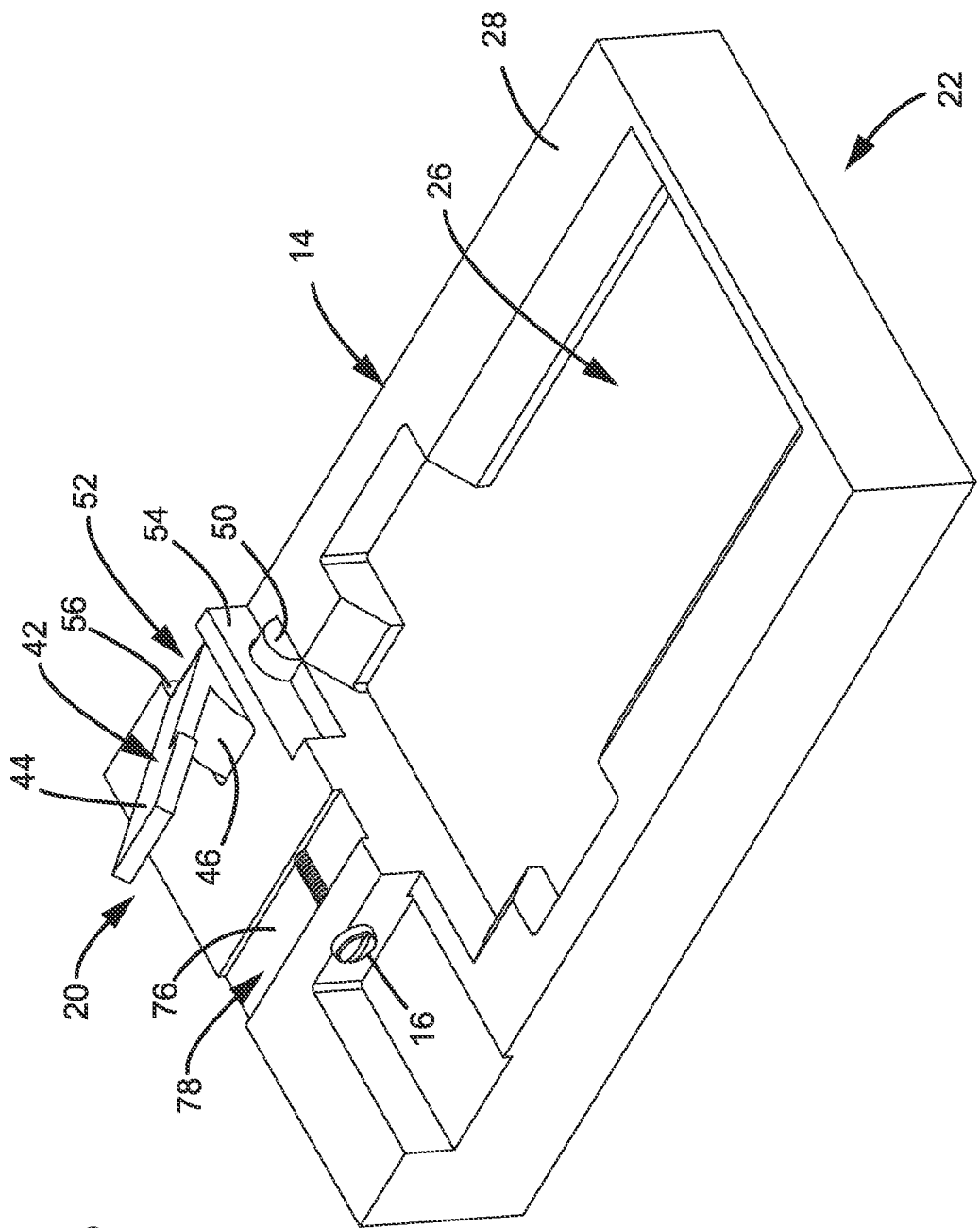
FIG. 3 is a perspective view of the base member of FIG. 1 with the fiber holder removed.
Figure 4:
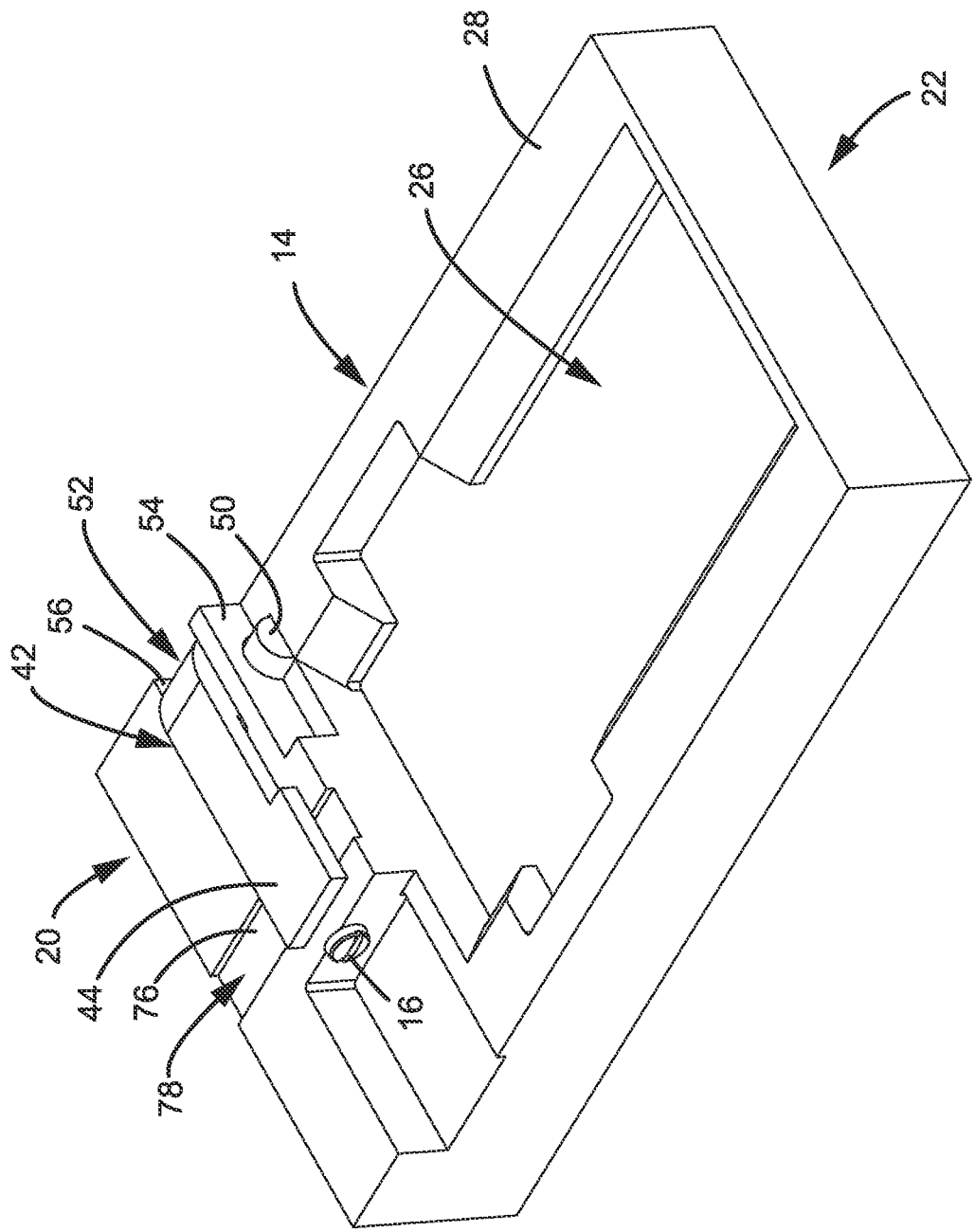
FIG. 4 is a perspective view of the base member of FIG. 2 with the fiber holder removed.
Figure 5:
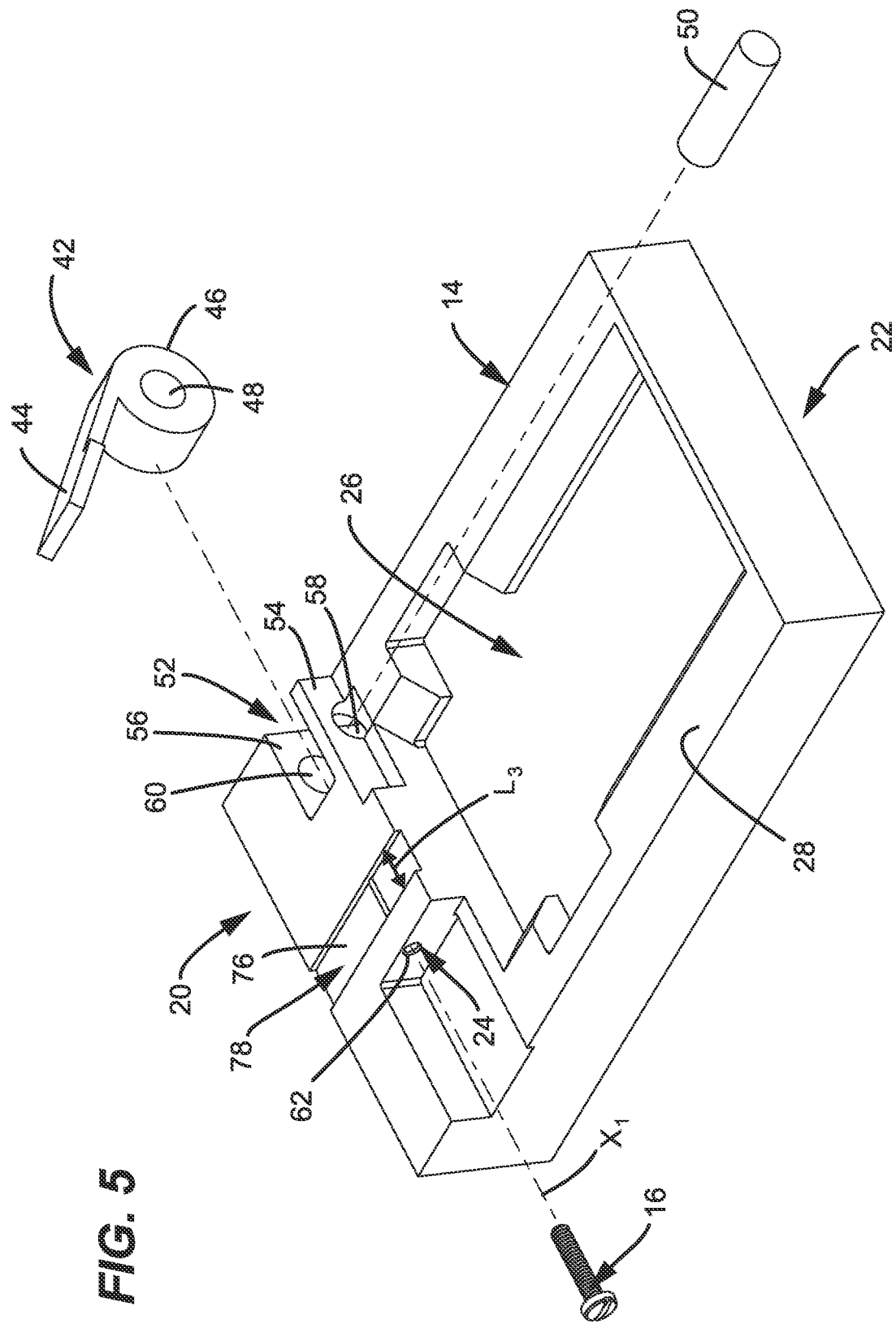
FIG. 5 is an exploded view of the base member of FIG. 3.
Figure 6:
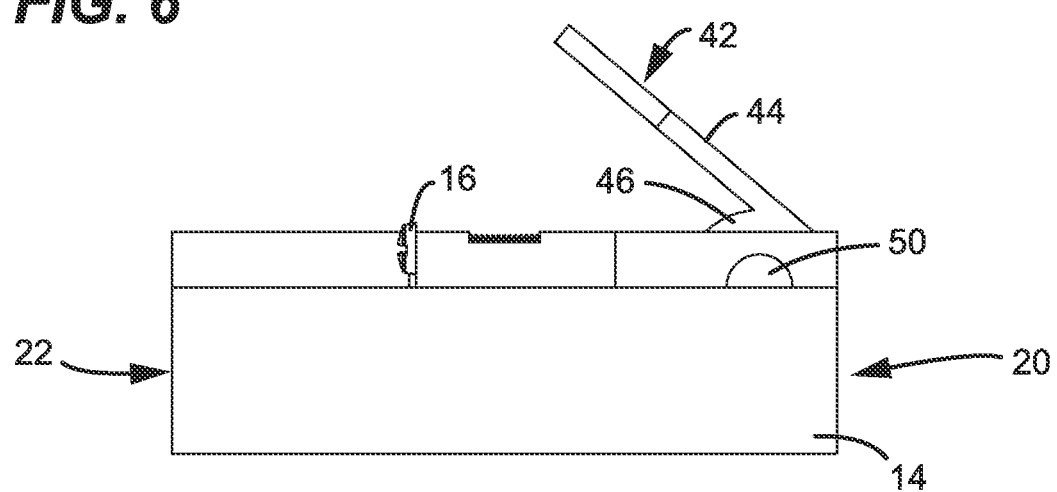
FIG. 6 is a side view of the base member of FIG. 3.
Figure 7:
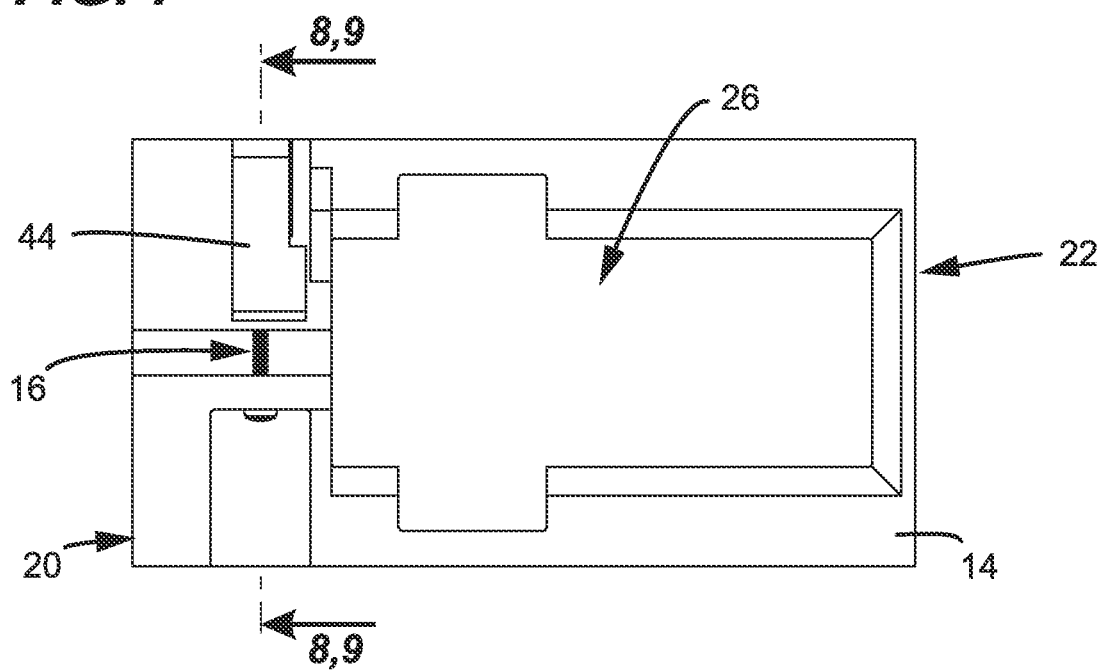
FIG. 7 is a top view of the base member of FIG. 3.
Figure 8:
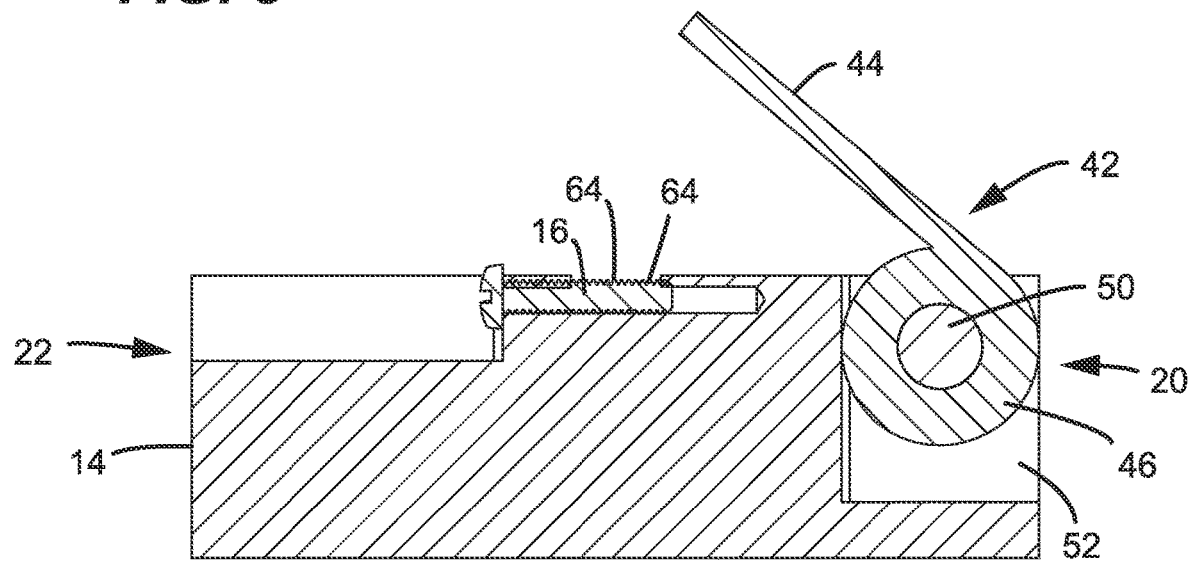
FIG. 8 is a cross-sectional view taken along section line 8-8 of FIG. 7.
Figure 9:
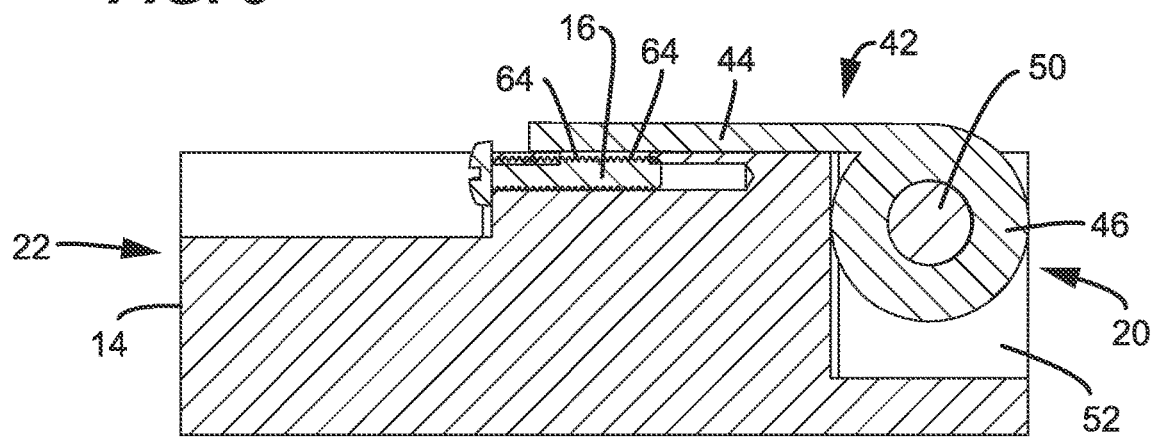
FIG. 9 is a cross-sectional view taken along section line 9-9 of FIG. 7.

The illustrated pitch conversion apparatus 10 can include a base member 14, a separator element 16 (e.g., a pitch conversion device), and a fiber holder 18. The base member 14 has a first end 20, a second end 22, and a separator mounting location 24 (see FIG. 5). The base member 14 is generally square and defines a recess 26 (e.g., cavity, opening)(see FIG. 3) in a top surface 28 thereof to receive the fiber holder 18.

In the illustrated example, the separator mounting location 24 is located adjacent to the first end 20 of the base member 14, although alternatives are possible. In certain examples, the separator mounting location 24 may be located adjacent to the second end 22 of the base member 14. In still other examples, the separator mounting location 24 may be centrally positioned between the first and second ends 20, 22 of the base member.

The separator element 16 can be positioned at the separator mounting location 24 of the base member 14. In certain examples, the separator element 16 may include a machined part. In certain examples, the separator element 16 may include a metal pin, a screw member, although alternatives are possible. In certain examples, the separator element 16 may include raised and lowered sections that together define a pitch diameter. In certain examples, the separator element 16 may include raised helical threads that define grooves to define a pitch diameter. That is, the separator element 16 may include raised helical threads running thereabout defining grooves to receive and sequence the coated optical fibers with respect to each other such that the coated optical fibers have a pitch diameter adapted for use with a pitch diameter of a multi-fiber connector.

The coated optical fibers 12 may be spaced apart to define a gap between each optical fiber making a pitch diameter. A pitch diameter is defined as a distance from a point on one optical fiber to a corresponding point on an adjacent optical fiber as measured across a horizontal axis between adjacent optical fibers in a rollable ribbon. In certain examples, the coated optical fibers 12 can have a coating diameter of 200 micrometers or smaller. In certain examples, the coated optical fibers 12 may have a coating diameter of 150 micrometers, although alternatives are possible. The advantage of the smaller/thinner optical fiber is its smaller surface area compared with a 250 micrometer optical fiber. As such, cables can be placed in smaller tubes to create more space for additional cables, which can be an economic benefit for customers looking to reduce the size of their cables.

Still referring to FIGS. 1-2, the fiber holder 18 can be positioned in the recess 26 of the base member 14. The recess 26 of the base member 14 having a geometric shape that corresponds with a geometric shape of the fiber holder 18 to provide a friction fit for the fiber holder 18 when mounted therein. The fiber holder 18 includes a clamp 30 (see FIG. 1) that is pivotally attached to a body 32 of the fiber holder 18. The clamp 30 can be rotatable between open and closed positions. The fiber holder 18 can include a fiber recess region 34 (e.g., channel) for receiving the coated of optical fibers 12 extending from the separator element 16. As depicted, the coated optical fibers 12 extend beyond the first and second ends 20, 22 of the base member 14.

The clamp 30 can have a clamp portion 36 that, when in the closed position (see FIG. 2), helps to hold the coated optical fibers 12 in the fiber recess region 34. The clamp 30 may include a magnetic portion 38 that, when pivoted to a closed, locked position, connects with a magnet piece 40 supported by the base member 14, although alternatives are possible. In certain examples, the clamp 30 may be locked by a snap-fit connection, although alternatives are possible.

In certain examples, the pitch conversion apparatus 10 can further include a clip pin 42 (e.g., spring clip) mounted on the base member 14. The clip pin 42 can have an arm 44 extending from a rotation cam 46 of the clip pin 42. The rotation cam 46 can define a hole 48 for receiving a rotation pin 50 that forms a pivot shaft for the pivotally mounting the clip pin 42 to the base member 14. The rotation cam 46 can be mounted at the first end 20 in a cutout seat 52 defined by the base member 14. The cutout seat 52 includes opposing walls 54, 56 that each define an aperture 58, 60 for receiving the rotation pin 50. When the rotation cam 46 of the clip in 42 is mounted to the base member 14, the rotation pin 50 extends along a pin axis $X_1$ through the hole 48 and apertures 58, 60 of the opposing walls 54, 56.

The clip pin 42 can have spring like characteristics that allow the clip pin 42 to be generally flexible. The clip pin 42 can be closed over the separator mounting location 24 to compress and hold/trap the coated optical fibers 12 to prevent the coated optical fibers 12 from coming out of position after being sequenced. The clip pin 42 is configured to retain the coated optical fibers 12 in position with just a slight or minimal pressure being applied. The coated optical fibers 12 can lie parallel to one another to simulate a ribbonized arrangement.

In certain examples, the clip pin 42 may not be configured to lock relative to the base member 14. As such, the clip pin 42 can be flexible and have spring-like characteristics intended for use in maintaining efficient contact with the coated optical fibers 12. The clip pin 42 does not include a snap-fit connection or other locking configuration, although alternatives are possible. It will be appreciated that the clip pin may, for example, have a different appearance in shape, thickness, width, length, and so forth. For example, a L-shaped clip pin may be used.

The clip pin 42 and the base member 14 may be molded from a plastic material or the like, although alternatives are possible. The material can include thermal plastic materials such as polyethylene, polypropylene, ethylene-propylene, copolymers, polystyrene and styrene copolymers, polyvinyl chloride, polyamide (i.e., nylon), polyesters such as polyethylene terephthalate, polyetheretherketone, polyphenylene sulfide, polyetherimide, polybutylene terephthalate, as well as other plastic materials, ABS, polycarbonate or any combination thereof, or metallic materials.

Turning to FIGS. 6-10, the separator element 16 is shown mounted onto the base member 14 at the separator mounting location 24. The separator mounting location 24 defines an opening 62 defining a central axis $X_2$ through which the separator element 16 is received, the central axis $X_2$ being perpendicular to the pin axis $X_1$. That is, the separator element 16 can be secured to the base member 14 and extend in a direction perpendicular to the pin axis $X_1$. In certain examples, the separator element 16 may be threaded into the opening 62 of the separator mounting location 24, although alternatives are possible.

Figure 10:
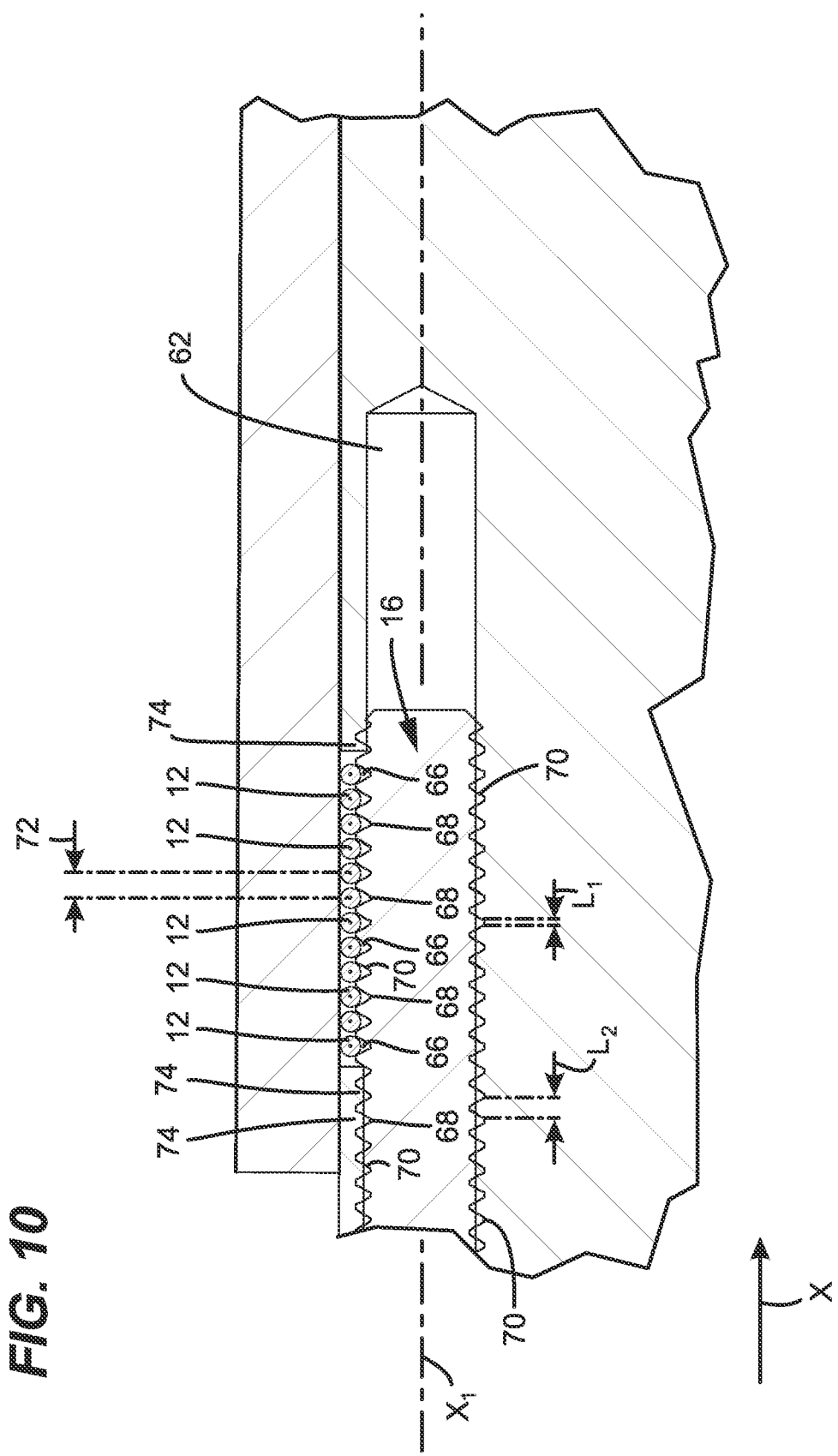
FIG. 10 is an enlarged cross-sectional view of a portion of the separator element of FIG. 9.

In the example illustrated in FIG. 10, the separator element 16 includes a plurality of ridges 64 (e.g., dividers) defining a plurality of grooves 66. The plurality of grooves 66 are of generally V-shaped cross section having base portions 68 midway between the ridges 64. In the example shown, the separator element 16 has a continuous helical roll thread 70 of uniform pitch 72 (e.g., pitch diameter). The uniform pitch 72 is defined as a distance from a point on one coated optical fiber to a corresponding point on an adjacent coated optical fiber as measured across a horizontal axis between adjacent coated optical fibers 12. The plurality of ridges 64 form the continuous helical roll thread 70 with a constant outer diameter and a constant thickness $L_1$ (see FIG. 10) in the X direction, although alternatives are possible. Spaces 74 between the plurality of ridges 64 of the separator element 16 can have a width $L_2$ (e.g., gap) in the X direction. The width $L_2$ is preferably wide enough into which one of the coated optical fibers 12 can be dropped between adjacent the plurality of ridges 64 from above. That is, the spaces 74 between distal free top ends of the plurality of ridges 64 are open to allow the coated optical fibers to be inserted. Preferably, the width $L_2$ defining the spaces 74 is greater than the thickness $L_1$ of the plurality of ridges 64.

In use, the coated optical fibers 12 can be easily arranged on an upper surface 76 of a fiber holding segment 78 of the base member 14. Once organized within the fiber holding segment 78, the 200 micron, or smaller, coated optical fibers 12 can be inserted down into respective spaces 74 of the separator element 16. The separator element 16 can be arranged and configured to sequence the 200 micron, or smaller, coated optical fibers 12 by receiving the 200 micron, or smaller, coated optical fibers 12 within the plurality of grooves 66. The plurality of grooves 66 can be equally sized to provide the uniform pitch 72. The fiber holding segment 78 can have a width $L_3$ that properly aligns the 200 micron, or smaller, coated optical fibers 12 in preparation of conversion to a 250 micrometer pitch diameter.

In certain examples, the width $L_2$ of each space 74 between the plurality of ridges 64 can be about 200 micrometers, for example between 201 micrometers and about 203 micrometers. In other examples, the width $L_2$ of each space 74 between the plurality of ridges 64 can be about 150 micrometers. The thickness $L_1$ of each ridge 64 can be about 50 micrometers, for example between about 50 micrometers and about 53 micrometers, such that the uniform pitch 72 is at least the same as or slightly greater than 250 micrometers, for example about 253 micrometers. As such, the pitch diameters of the 200 micron, or smaller, coated optical fibers 12 is 250 micrometers, so as to connect to a 250 micrometer multi-fiber connector or to insert the 200 micron, or smaller, coated optical fibers 12 into a splicing apparatus.

Although the pitch conversion apparatus 10 is described with reference to twelve optical fibers, it will be appreciated that the pitch conversion apparatus 10 can also accommodate different fiber counts. That is, although twelve optical fibers is standard for many MPOs, any number of fibers may be converted to a 250 micrometer pitch. In certain examples, the pitch conversion apparatus 10 can be used to set a 250 micrometer pitch for two optical fibers, four optical fibers, six optical fibers, eight optical fibers, sixteen optical fibers. Any number of fibers can be processed with the spacing apparatus, and a clamp, anywhere from one fiber to sixteen fibers, any number in between, and more than sixteen fibers. Such an ability allows splicing with 250 micrometer spacing settings on the splicing equipment to be used with loose fibers or rollable ribbons where the fibers are needing to be spaced at 250 micrometers to fit into the splicing equipment.

The operation of the pitch conversion apparatus 10 will now be described. Another aspect of the present disclosure relates to a method of preparing optical fibers for insertion into an optical connector/ferrule. One example method may include the following steps: (1) placing the fiber holder 18 in the recess 26 of the base member 14; (2) mounting the 200 micrometer, or smaller, coated optical fibers 12 within the fiber holding segment 78 of the base member 14 and the fiber recess region 34 of the fiber holder 18; and (3) separating the 200 micrometer, or smaller, coated optical fibers.

The step of separating the 200 micrometer, or smaller, coated optical fibers 12 can include inserting the 200 micrometer, or smaller, coated optical fibers 12 into the plurality of grooves 66 of the separator element 16 to sequence the 200 micrometer, or smaller, coated optical fibers. The separator element 16 can be adapted to convert the sequenced 200 micrometer, or smaller, coated optical fibers 12 to a 250 micrometer pitch diameter.

In certain examples, the method can further include a step of trapping the 200 micrometer, or smaller, coated optical fibers 12 under the clip pin 42 to retain the sequenced alignment. The method can further include a step of rotating the clamp 30 to the open position to insert the 200 micrometer, or smaller, coated optical fibers within the fiber holder. The method can also include a step of rotating the clamp 30 to a closed position to lock the 200 micrometer, or smaller, coated optical fibers 12 within the fiber recess region 34.

The method may also include a step of processing the 200 micrometer, or smaller, coated optical fibers 12 to be connectorized after the 200 micrometer, or smaller, coated optical fibers have been sequenced. That is, once all of the 200 micrometer, or smaller, coated optical fibers 12 have been converted to have a 250 micrometer pitch diameter, the arrangement of the converted 250 micrometer pitch diameter coated optical fibers are ready to be potted within a ferrule. For example, the converted 250 micrometer pitch diameter coated optical fibers can be terminated to a 12-fiber ferrule (not shown). The 12-fiber ferrule can include internal grooves lying parallel to one another. It is a common industry practice to number the grooves and call them out as fiber positions from left to right. The converted 250 micrometer pitch diameter coated optical fibers can be inserted within a cavity filled with epoxy to be cured and locked in place within the ferrule, after which the pitch conversion apparatus 10 can be removed. When the converted 250 micrometer pitch diameter coated optical fibers are terminated to the 12 fiber ferrule, all fiber positions 1 to 12 inclusive will function as communication channels.

In certain examples, an industry standard MT ferrule can be used to terminate the converted 250 micrometer pitch diameter coated optical fibers. The converted 250 micrometer pitch diameter coated optical fibers can be terminated to the ferrule using any known methods currently practiced in the industry to yield a fiber optic connector (not shown). For example, it is common practice to position the converted 250 micrometer pitch diameter coated optical fibers so that the converted 250 micrometer pitch diameter coated optical fibers protrude from a front face of the 12-fiber ferrule.

The method may also include a step of splicing the converted 250 micrometer pitch diameter coated optical fibers.

In one method step, the user can hold the ribbon cable and gently slide it axially back and forth relative to the separator element 16 and while the ribbon cable is in contact with the separator, to help facilitate the individual fibers become properly located in the separator element 16. This movement of the ribbon cable can also help to separate the fibers from one another through breaking the intermittent connection points of the ribbon in the area to be sliced or connectorized.

One possible variation that may be useful is to integrate the separator element 16 with the clamp 30 so that the two features remain together.

Figure 11:
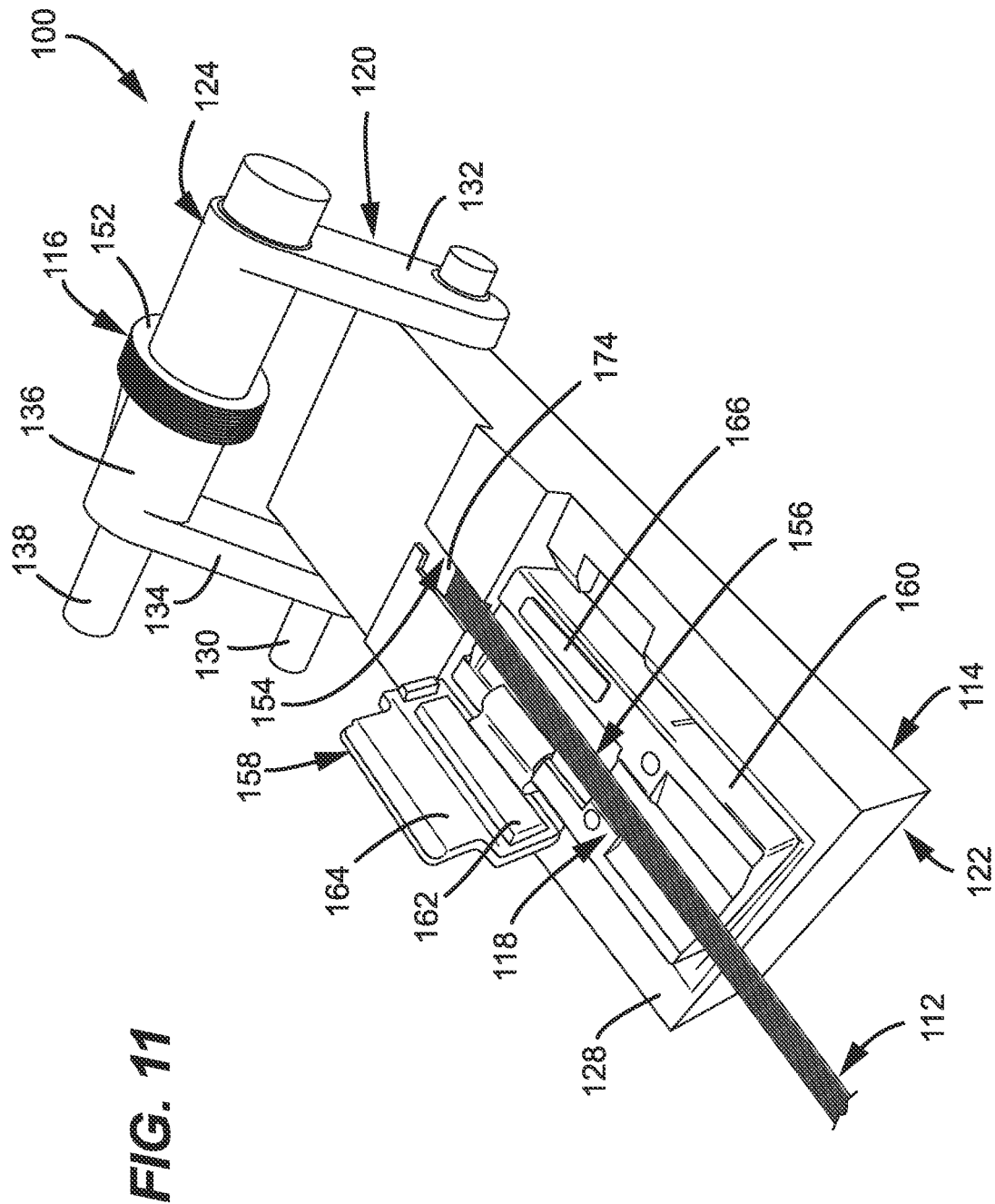
FIG. 11 is a perspective view of a pitch conversion apparatus including a base member, a separator lever arm including a separator element, and a fiber holder in accordance with the principles of the present disclosure, where a clamp of the fiber holder is shown in an open position.
Figure 12:
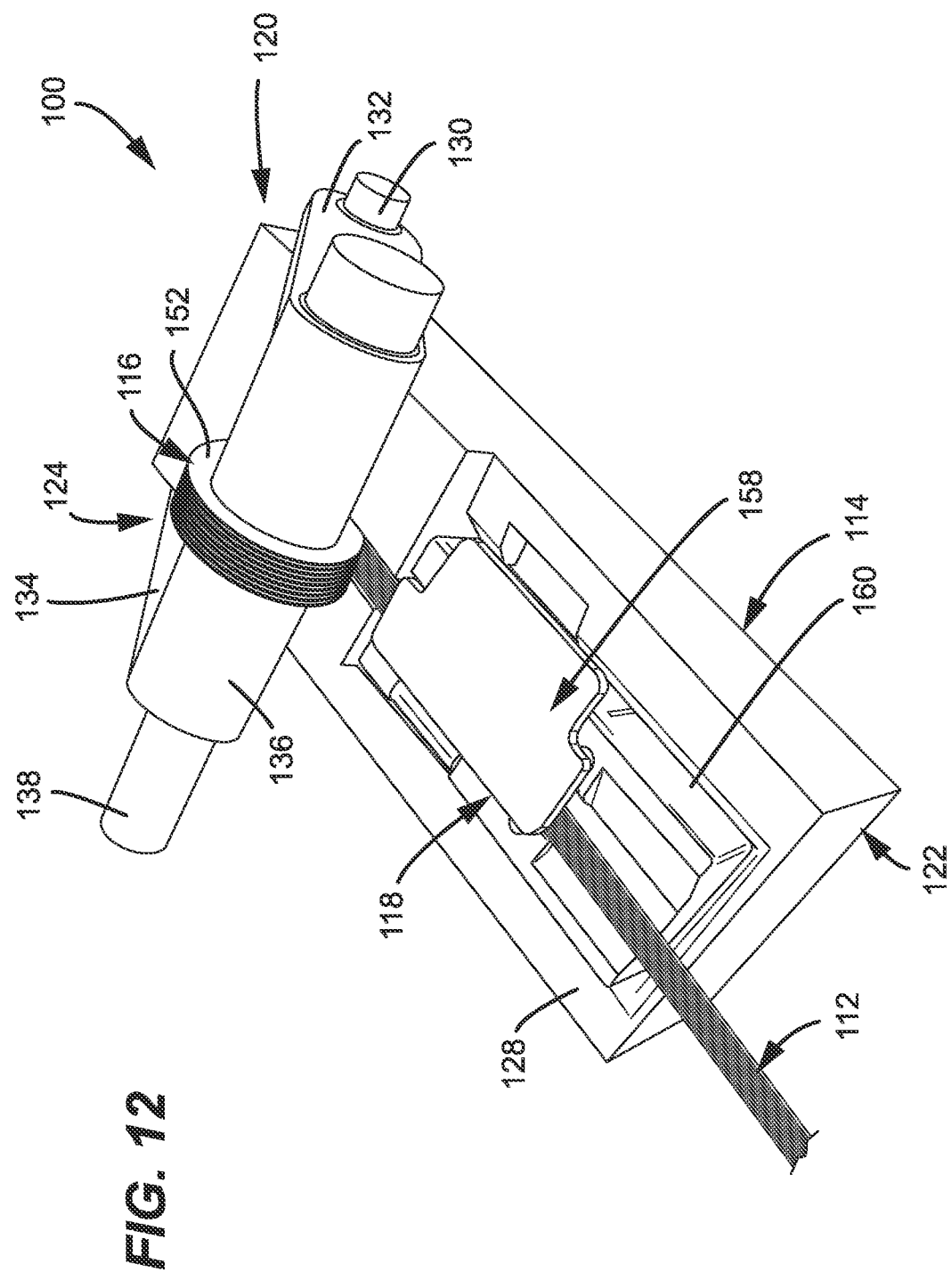
FIG. 12 is a perspective view of the apparatus of FIG. 11 showing the clamp of the fiber holder in a closed position and the separator lever arm pivoted toward the base member.

Referring to FIGS. 11-12, an alternative pitch conversion apparatus 100 is depicted that can be utilized to convert a plurality of coated optical fibers at a smaller than 250 micrometer pitch to a 250 micrometer pitch diameter in preparation for use with a multi-fiber connector and/or for splicing in accordance with the principles of the present disclosure. In certain examples, the coated optical fibers 112 can have a coating diameter of 200 micrometers or smaller. In certain examples, the coated optical fibers 112 may have a coating diameter of 150 micrometers, although alternatives are possible. The advantage of the smaller/thinner optical fiber is its smaller surface area compared with a 250 micrometer optical fiber. As such, cables can be placed in smaller tubes to create more space for additional cables, which can be an economic benefit for customers looking to reduce the size of their cables. The apparatus 100 can be configured for receiving and sequencing 200 micron, or smaller, coated optical fibers 112 (e.g., 12 optical fibers) of a fiber optic cable relative to one another for further processing.

The coated optical fibers 112 can be arranged and configured as a rollable optical fiber ribbon in which the 200 micron, or smaller, coated optical fibers 112 are mechanically bounded together by a binding material. In certain examples, the binding material can be webs of polymer material coupled between outer layers of adjacent optical fibers. In certain examples, the webs can be discontinuous and run in a lengthwise direction along a length of the optical fibers. The structure of the rollable optical fiber ribbon helps with separating and identifying optical fibers and for splicing. The optical fibers can be presented flat and in order, so no ordering of fiber is necessary to prepare for a splice or for termination. The fiber pitch of the rollable ribbon of the 200 micron fibers is therefore smaller and not compatible with a 250 micron cable, MPO connectors, and mass fusion splicers.

The illustrated pitch conversion apparatus 100 can include a base member 114, a separator element 116, and a fiber holder 118. The base member 114 has a first end 120, a second end 122, and a separator lever arm 124 located adjacent to the first end 120 of the base member 114 for supporting the separator element 116. In certain examples, the separator lever arm 124 may be located adjacent to the second end 122 of the base member 114. In still other examples, the separator lever arm 124 may be centrally positioned between the first and second ends 120, 122 of the base member.

Figure 13:
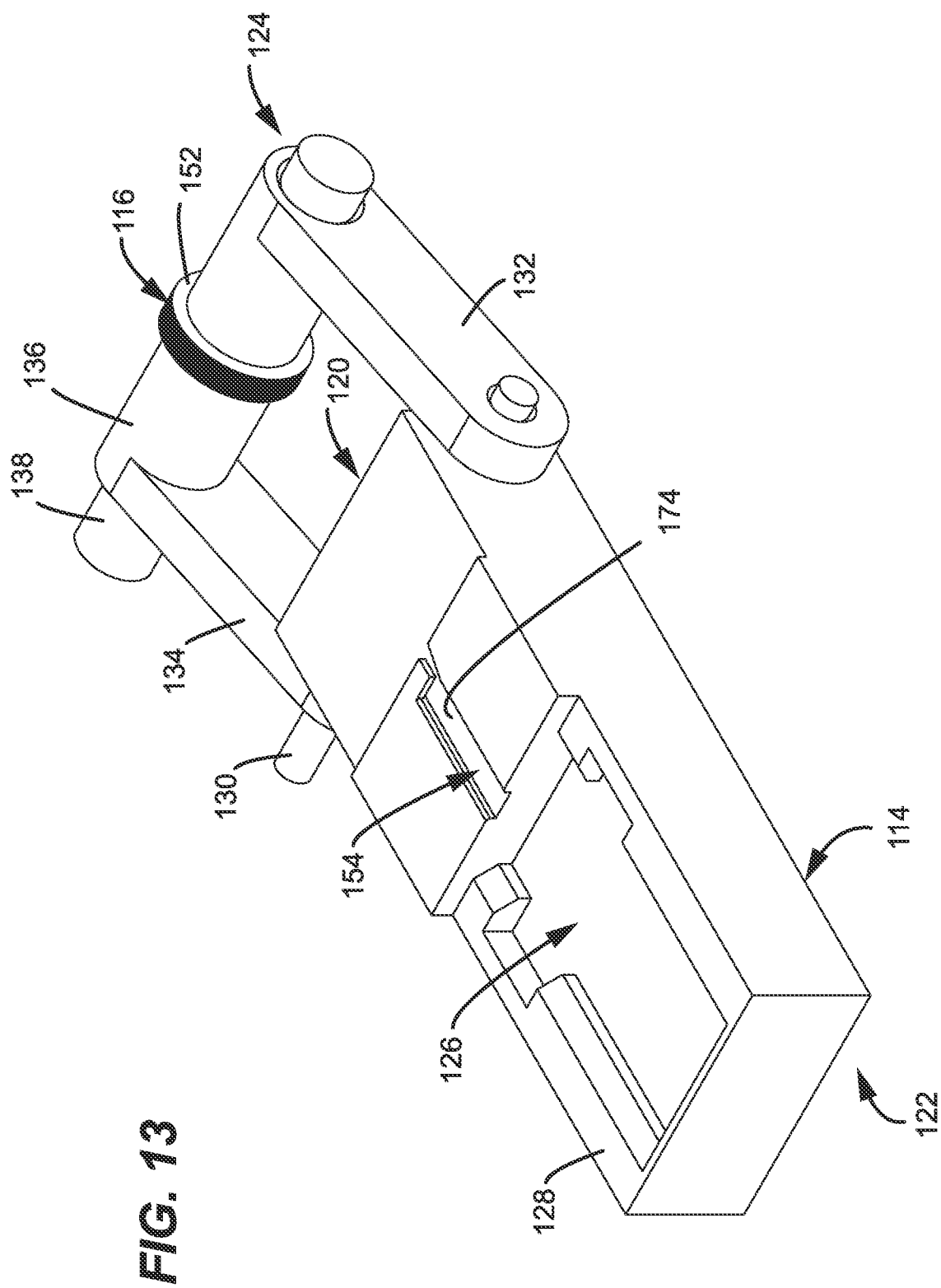
FIG. 13 is a perspective view of the base member of FIG. 11 with the fiber holder removed.
Figure 14:
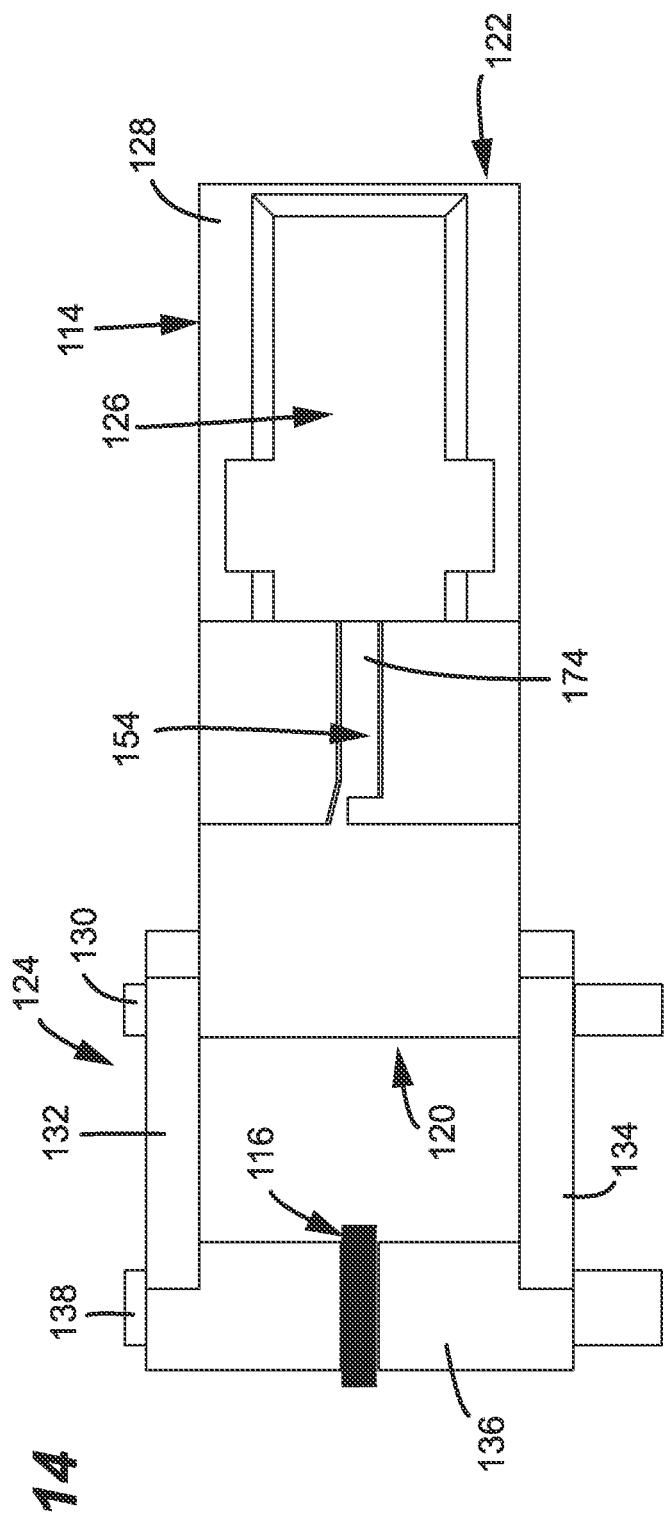
FIG. 14 is a top view of the base member of FIG. 13.
Figure 15:
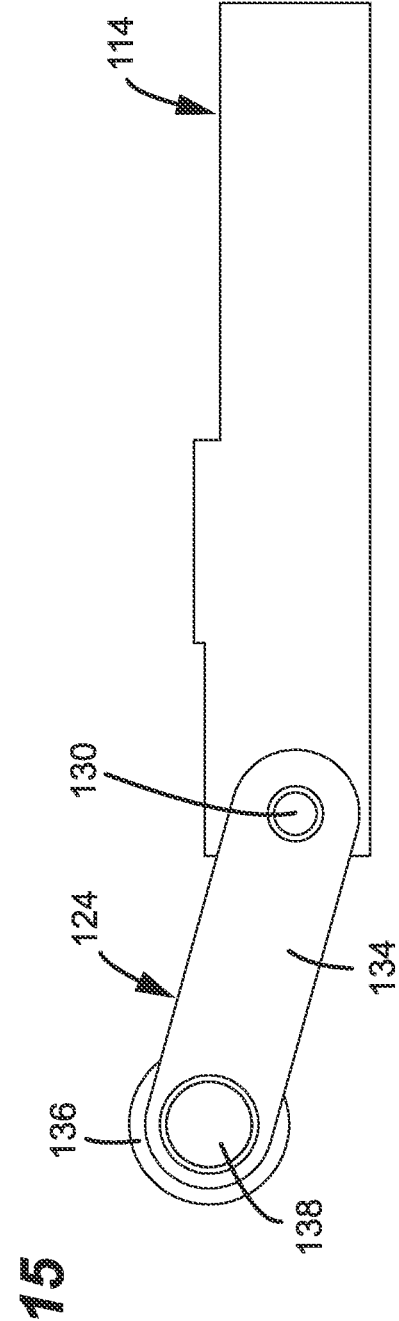
FIG. 15 is a side view of the base member of FIG. 13.
Figure 16:
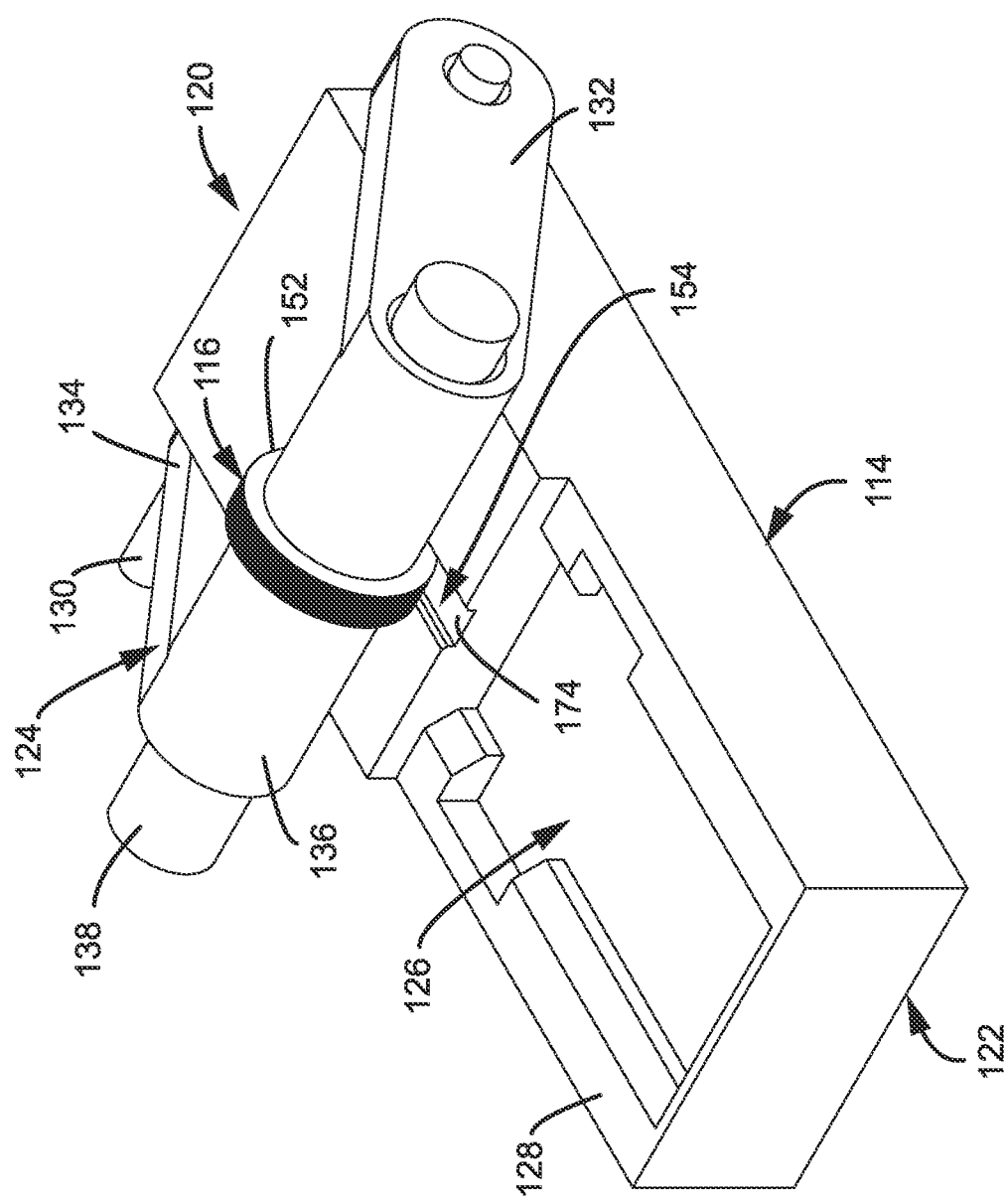
FIG. 16 is a perspective view of the base member of FIG. 12 with the fiber holder removed.

The base member 114 is generally square and defines a recess 126 (e.g., cavity, opening)(see FIG. 13) in a top surface 128 thereof to receive the fiber holder 118. The recess 126 of the base member 114 can have a geometric shape that corresponds with a geometric shape of the fiber holder 118 to provide a friction fit for the fiber holder 118 when mounted therein.

The base member 114 and the separator lever arm 124 may be molded from a plastic material or the like, although alternatives are possible. The material can include thermal plastic materials such as polyethylene, polypropylene, ethylene-propylene, copolymers, polystyrene and styrene copolymers, polyvinyl chloride, polyamide (i.e., nylon), polyesters such as polyethylene terephthalate, polyetheretherketone, polyphenylene sulfide, polyetherimide, polybutylene terephthalate, as well as other plastic materials, ABS, polycarbonate or any combination thereof, or metallic materials.

Figure 19:
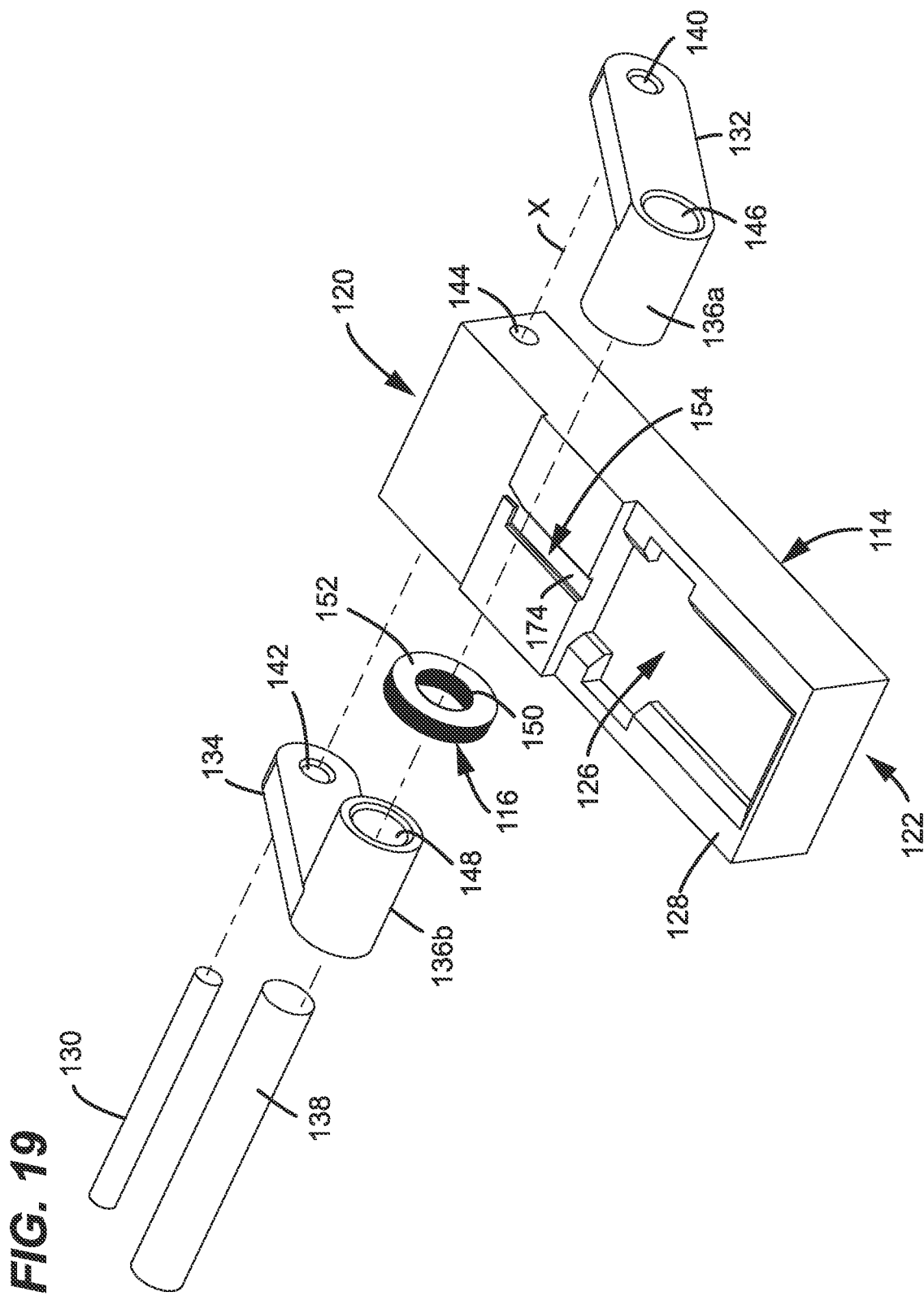
FIG. 19 is an exploded view of the base member of FIG. 16.

Referring to FIGS. 13-16, the separator lever arm 124 can be pivotally or rotatably mounted to the base member 114 by a first pivot pin 130 in the form of a first rivet. That is, the separator lever arm 124, which carries the separator element 116, can be pivotally-mounted on the first pivot pin 130 forming a pivot axis X. The separator lever arm 124 can include two side arm members 132, 134 and a mounting bar 136 mounted between the two side arms 132, 134 by a second pivot pin 138 in the form of a second rivet. In certain examples, the first and second pivot pins 130, 138 can be constructed from a metallic material, although alternatives are possible. The first pivot pin 130 can extend through openings 140, 142 (see FIG. 19) defined in the two side arms 132, 134 of the separator lever arm 124 and through an aperture 144 (see FIG. 17) defined in the base member 114 to attach the separator lever arm 124 to the base member 114.

Pivoting or rotating the separator lever arm 124 allows a user to set a desired position of the separator element 116 relative to the base member 114. Thus, when the separator lever arm 124 is pivoted about the first pivot pin 130, a corresponding pivot movement is transmitted to the separator element 116 to move the separator element 116 in a direction towards the base member 114 or away from the base member 114. In certain examples, the separator lever arm 124 may be pivotally-mounted on a pair of aligned pins that form the pivot axis X.

Figure 17:
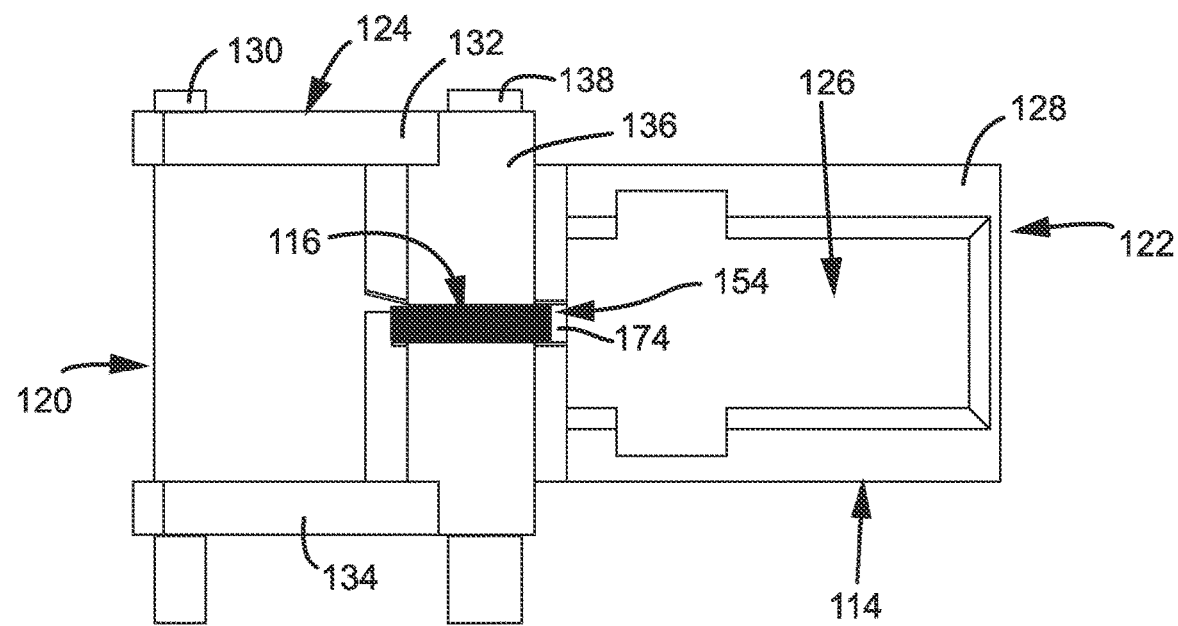
FIG. 17 is a top view of the base member of FIG. 16.
Figure 18:
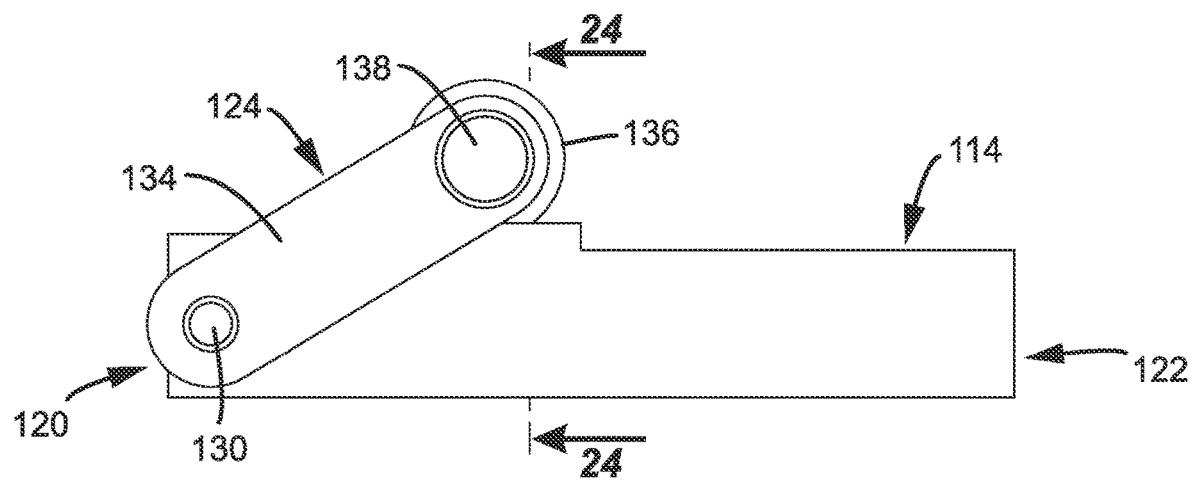
FIG. 18 is a side view of the base member of FIG. 16.

Turning to FIG. 17, the two side arms 132, 134 can each include a respective mounting bar sections 136a, 136b. In certain examples, the mounting bar sections 136, 136b can be attached together via a snap-fit connection to form the mounting bar 136, although alternatives are possible. The separator element 116 can be positioned on the mounting bar 136 when the two mounting bar sections 136a, 136b are detached for ease of apparatus. When the two mounting bar sections 136a, 136b are attached together, the second pivot pin 138 can be received through openings 146, 148 defined in the two side arms 132, 134 to extend through the mounting bar sections 136a, 136b and a hole 150 defined by the separator element 116.

In certain examples, the separator element 116 may include machined parts. In the example shown, the separator element 116 includes a plurality of washers 152, although alternatives are possible. In certain examples, the separator element 116 may include a plurality of circular shims, although alternatives are possible. In certain examples, the separator element 116 may include a plurality of rings, although alternatives are possible. The plurality of washers 152 can be made of metal, rubber, or plastic.

The base member 114 can define a fiber holding section 154 for receiving the 200 micron, or smaller, coated optical fibers 112. When the fiber holder 118 is positioned in the recess 126 of the base member 114 as shown in FIGS. 1-2, the 200 micron, or smaller, coated optical fibers 112 can be arranged in an axial direction and extend into the fiber holder 118. That is, during use of the pitch conversion apparatus 100, the 200 micron, or smaller, coated optical fibers 112 can be placed parallel to one another in the form of a rollable optical fiber ribbon in the fiber holding section 154 of the base member 114. The fiber holder 118 can include a fiber recess region 156 (e.g., channel) for receiving the 200 micron, or smaller, coated optical fibers 112 extending from the separator element 116. As depicted, the 200 micron, or smaller, coated optical fibers 112 extend axially beyond the first and second ends 120, 122 of the base member 114.

In certain examples, the fiber holder 118 can include a clamp 158 pivotally attached to a body 160 of the fiber holder 118. The clamp 158 of the fiber holder 118 can be rotatable between open and closed positions. The clamp 158 of the fiber holder 118 may include a clamping portion 162 that, when the clamp 158 is pivoted to the closed position (see FIG. 12), helps to hold the 200 micron, or smaller, coated optical fibers 112 in the fiber recess region 156 of the fiber holder 118. The clamp 158 may include a magnetic portion 164 that, when pivoted to a closed, locked position, connects with a magnet piece 166 supported by the base member 114, although alternatives are possible. In certain examples, the clamp 158 may be closed, locked by a snap-fit connection, although alternatives are possible.

Turning to FIGS. 18-23, the separator lever arm 124 is shown pivoted toward the base member 114 to position the separator element 116 within the fiber holding section 154 of the base member 114. In certain examples, the plurality of washers 152 can be evenly spaced within the fiber holding section 154. In certain examples, the separator lever arm 124 can be manually lowered or pushed down to engage the fiber holding section 154, although alternatives are possible. In certain examples, the separator lever arm 124 may be operated automatically.

Once positioned in the fiber holding section 154 of the base member 114, the plurality of washers 152 can engage the 200 micron, or smaller, coated optical fibers 112 also positioned within the fiber holding section 154 of the base member 114. The plurality of washers 152 can be arranged and configured to separate the 200 micron, or smaller, coated optical fibers 112 to provide a 250 micrometer pitch diameter. That is, when the 200 micron, or smaller, coated optical fibers 112 are inserted into respective spaces defined by the plurality of washers 152, the plurality of washers 152 can set the proper 50 micrometer spacing for the 200 micron, or smaller, coated optical fibers 112 in preparation of entering a MPO or splicing apparatus. In certain examples, the plurality of washers 152 can set the proper 100 micrometer spacing for the 150 micron coated optical fibers 112 in preparation of further processing (e.g., connectorization and/or splicing).

Figure 25:
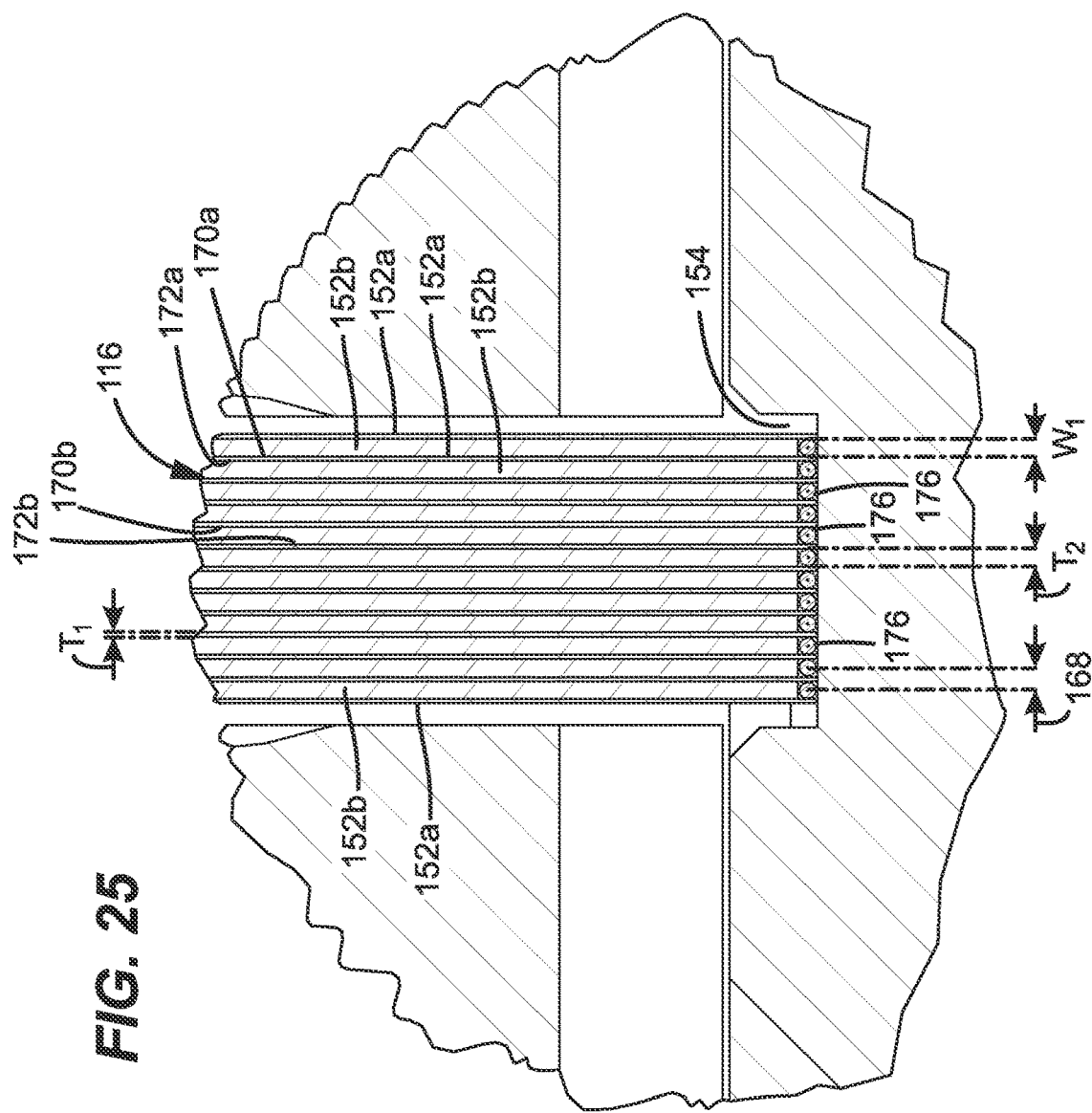
FIG. 25 is an enlarged cross-sectional view of a portion of FIG. 24.
Figure 24:
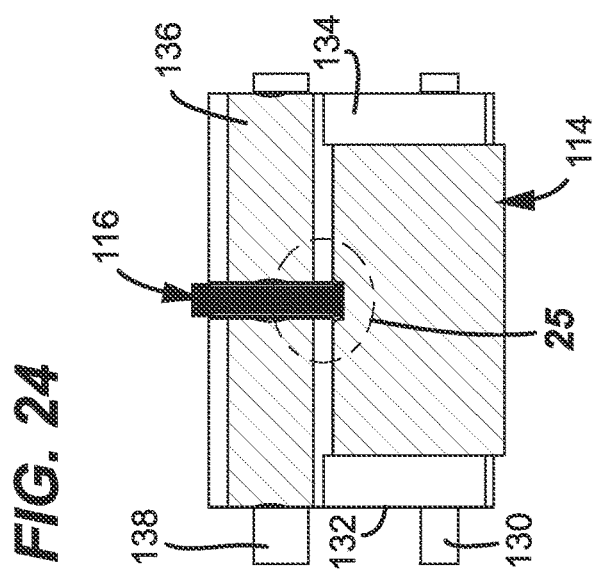
FIG. 24 is a cross-sectional view taken along section line 24-24 of FIG. 18.

Details of the plurality of washers 152 will now be described with reference to FIG. 25. In the example illustrated, the plurality of washers 152 provide evenly spaces between the 200 micron, or smaller, coated optical fibers 112 to set a uniform pitch 168 (e.g., pitch diameter).

As used herein, the term, "pitch diameter" and variants thereof, in this context, is defined as a distance from a point on one coated optical fiber to a corresponding point on an adjacent coated optical fiber as measured across a horizontal axis between adjacent coated optical fibers.

Figure 20:
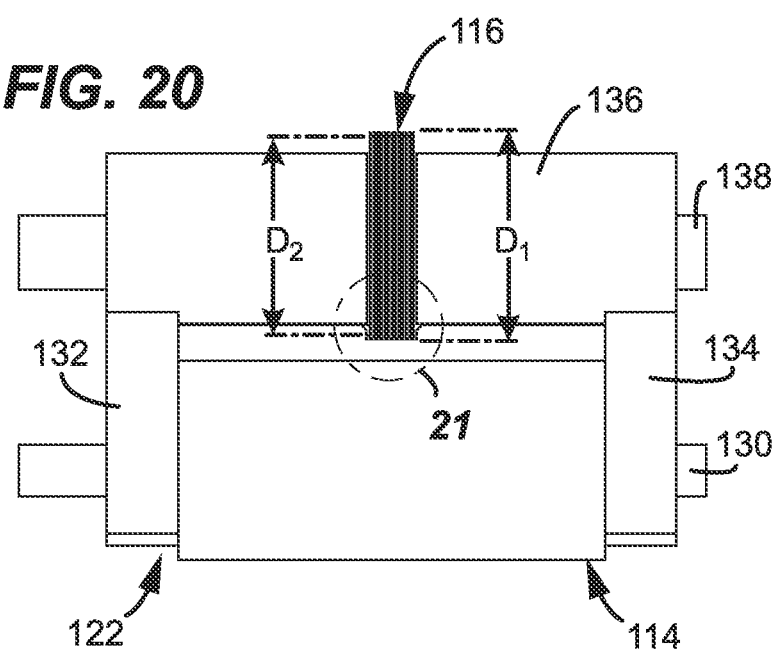
FIG. 20 is an end view of the base member of FIG. 16.
Figure 21:
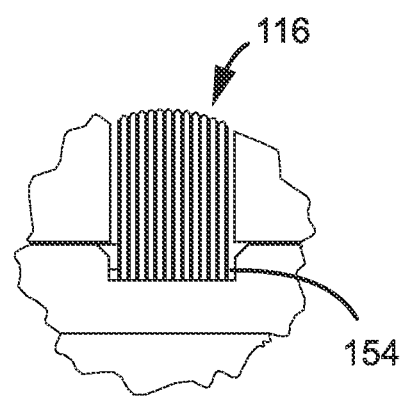
FIG. 21 is an enlarged view of a portion of the base member of FIG. 20.
Figure 22:
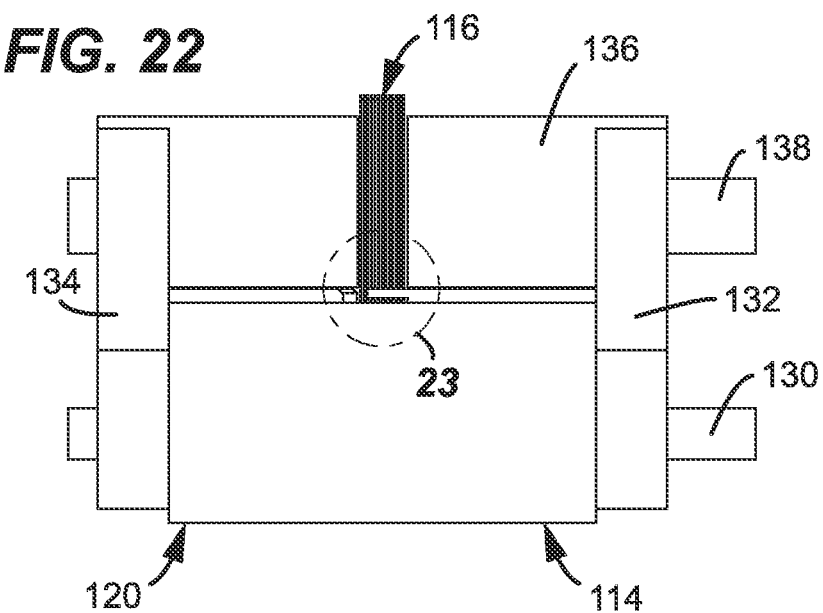
FIG. 22 is an opposite end view of the base member of FIG. 20.
Figure 23:
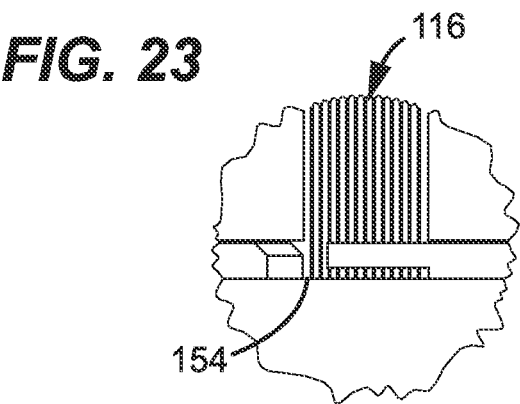
FIG. 23 is an enlarged view of a portion of the base member of FIG. 22.

The plurality of washers 152 can include first washers 152a that have a first cross-dimension $D_1$ (see FIGS. 20, 21) and second washers 152b that have a second cross-dimension $D_2$ (see FIGS. 20, 21). In certain examples, the first washers 152a can also have a first thickness $T_1$ and the second washers 152b can have a second thickness $T_2$. In certain examples, the second thickness $T_2$ is greater than the first thickness $T_1$. The plurality of washers 152 are arranged and configured such that the first and second washers 152a, 152b alternate relative to one another. That is, each washer 152 can have first and second opposing faces 170a, 170b, 172a, 172b and each first washer 152a can be oriented such that its first face 170a is adjacent to the second face 172b of each adjacent second washer 152b and its second face 172a is adjacent to the first face 170b of each adjacent second washer 152b.

The first washers 152a of the plurality of washers 152 can have a height greater than the second washers 152b of the plurality of washers 152. As such, when the plurality of washers 152 are mounted in the fiber holding second 154, the first washers 152a can rest on a bottom surface 174 (see FIG. 19) of the fiber holding section 154 to act as dividers between the 200 micron, or smaller, coated optical fibers 112. Because the second washers 152b have a shorter height, the second washers 152b can be recessed relative to the bottom surface 174 of the fiber holding section 154 to not rest thereon but to define a plurality of pockets 176 that receive and sequence the 200 micron, or smaller, coated optical fibers 112 with respect to each other. That is, the first and second washers 152a, 152b of the plurality of washers 152 can provide raised and lowered sections that together define the uniform pitch 168. Preferably, the second thickness $T_2$ of the second washers 152b is equal to a width Wi of each one of the plurality of pockets 176. The second thickness $T_2$ of the second washers 152b provides the proper spacing for the 200 micron, or smaller, coated optical fibers 112 to achieve the uniform pitch 168.

In certain examples, the width Wi of each one of the plurality of pockets 176 between the first washers 152a can be about 200 micrometers, for example between 201 micrometers and about 203 micrometers. In other examples, the width Wi of each one of the plurality of pockets 176 between the first washers 152a can be about 150 micrometers.

Each one of the plurality of pockets 176 can be configured such that only one of the 200 micron, or smaller, coated optical fibers 112 can be received therein. That is, the width Wi of each one of the plurality of pockets 176 is preferably wide enough such that one of the 200 micron, or smaller, coated optical fibers 112 can be dropped between adjacent first washers 152a when the separator lever arm 124 is pivoted to position the plurality of washers 152 in the fiber holding section 154 to engage the 200 micron, or smaller, coated optical fibers 112 therein. In certain examples, the 200 micron, or smaller, coated optical fibers 112 can slide axially into the fiber holding section 154 of the base member 114 while the plurality of washers 152 are positioned therein such that the 200 micron, or smaller, coated optical fibers 112 pop into or fall into the plurality of pockets 176.

The first thickness $T_1$ of each first washer 152a can be about 50 micrometers, for example between about 50 micrometers and about 53 micrometers, such that the uniform pitch 168 is at least the same as or slightly greater than 250 micrometers, for example about 253 micrometers. As such, the pitch diameter of the 200 micron, or smaller, coated optical fibers 112 can be converted to 250 micrometers for further processing, for example, for termination to a 250 micrometer multi-fiber connector or preparation for a splicing apparatus.

In certain examples, the first thickness $T_1$ of each first washer 152a can be about 100 micrometers, for example between about 100 micrometers and about 103 micrometers, such that the uniform pitch 168 is at least the same as or slightly greater than 250 micrometers, for example about 253 micrometers. As such, the pitch diameter of the 150 micron coated optical fibers 112 can be converted to 250 micrometers for further processing, for example, for termination to a 250 micrometer multi-fiber connector or preparation for a splicing apparatus.

Although the pitch conversion apparatus 100 is described with reference to twelve optical fibers, it will be appreciated that the pitch conversion apparatus 100 can also accommodate different fiber counts. That is, although twelve optical fibers is standard for many MPOs, any number of fibers may be converted to a 250 micrometer pitch. In certain examples, the pitch conversion apparatus 100 can be used to set a 250 micrometer pitch for two optical fibers, four optical fibers, six optical fibers, eight optical fibers, sixteen optical fibers. Any number of fibers can be processed with the spacing apparatus, and a clamp, anywhere from one fiber to sixteen fibers, any number in between, and more than sixteen fibers. Such an ability allows splicing with 250 micrometer spacing settings on the splicing equipment to be used with loose fibers or rollable ribbons where the fibers are needing to be spaced at 250 micrometers to fit into the splicing equipment.

The operation of the pitch conversion apparatus 100 will now be described. Another aspect of the present disclosure relates to a method of preparing 200 micron, or smaller, coated optical fibers for further processing, for example, insertion into an optical connector/ferrule or a splicing apparatus. One example method may include the following steps: (1) sliding the 200 micrometer, or smaller, coated optical fibers 112 axially into the fiber holding section 154 of the base member 114; and (2) separating the 200 micrometer, or smaller, coated optical fibers relative to one another. In FIG. 11, it is to be noted that the ribbon cable can be slid or located further past section 154, in a direction toward the pivot pin of the clamp 130.

In certain examples, the method may further include a step of mounting the fiber holder 118 in the recess 126 of the base member 114. In certain examples, the method can include a step of sliding the 200 micrometer, or smaller, coated optical fibers 112 axially into the fiber recess region 156 of the fiber holder 118.

In certain examples, the step of separating the 200 micrometer, or smaller, coated optical fibers 112 can include inserting the 200 micrometer, or smaller, coated optical fibers 112 into the plurality of pockets 176 defined by the separator element 116 to convert the 200 micrometer, or smaller, coated optical fibers to provide the 200 micrometer, or smaller, coated optical fibers with a 250 micrometer pitch diameter.

In certain examples, the method can further include a step of rotating the clamp 158 to the open position prior to insert the 200 micrometer, or smaller, coated optical fibers within the fiber holder 118. The method can also include a step of rotating the clamp 130 to a closed position to lock the inserted 200 micrometer, or smaller, coated optical fibers 112 within the fiber recess region 156.

The method may also include a step of processing the 200 micrometer, or smaller, coated optical fibers 112 having a 250 micrometer pitch diameter for termination to a MPO. That is, once all of the 200 micrometer, or smaller, coated optical fibers 112 have been converted to have a 250 micrometer pitch diameter, the arrangement of the converted 250 micrometer pitch diameter coated optical fibers are ready to be potted within a ferrule. For example, the converted 250 micrometer pitch diameter coated optical fibers can be terminated to a 12-fiber ferrule (not shown). The 12-fiber ferrule can include internal grooves lying parallel to one another. The converted 250 micrometer pitch diameter coated optical fibers can be inserted within a cavity filled with epoxy to be cured and locked in place within the ferrule, after which the pitch conversion apparatus 10 can be removed. When the converted 250 micrometer pitch diameter coated optical fibers are terminated to the 12 fiber ferrule, all fiber positions 1 to 12 inclusive will function as communication channels.

In certain examples, an industry standard MT ferrule can be used to terminate the converted 250 micrometer pitch diameter coated optical fibers. The converted 250 micrometer pitch diameter coated optical fibers can be terminated to the ferrule using any known methods currently practiced in the industry to yield a fiber optic connector (not shown). For example, it is common practice to position the converted 250 micrometer pitch diameter coated optical fibers so that the converted 250 micrometer pitch diameter coated optical fibers protrude from a front face of the 12-fiber ferrule.

The method may also include a step of inserting the 200 micrometer, or smaller, coated optical fibers 112 having a 250 micrometer pitch diameter into a splicing apparatus.

In one method step, the user can hold the ribbon cable and gently slide it axially back and forth relative to the separator 116 and while the ribbon cable is in contact with the separator, to help facilitate the individual fibers become properly located in the separator 116. This movement of the ribbon cable can also help to separate the fibers from one another through breaking the intermittent connection points of the ribbon in the area to be sliced or connectorized.

One possible variation that may be useful is to integrate the separator 116 with the clamp 158 so that the two features remain together.

Although virtually any type of fiber optic cable can be used in the present disclosure, tight buffered fiber cable are particularly suited because they can be easily stripped and they are useful in many applications. As commonly understood in the industry, a tight buffer fiber (TBF) cable is one that has a plastic coating applied directly over the buffer. In one exemplary embodiment, a 900 micrometer TBF cable having a 200 micrometer optical fiber is used. In another exemplary embodiment, a 900 micrometer TBF cable having a 150 micrometer optical fiber is used.

A ruggedized fiber optic cable can also be used in the present disclosure. A ruggedized fiber optic cable is one that contains strength members, such as aramid fibers, typically between the buffer and the protective jacketing or as part of the protective jacketing.

From the forgoing detailed description, it will be evident that modifications and variations can be made without departing from the spirit and scope of the disclosure.

What is claimed is:

1. A pitch conversion apparatus for aligning a plurality of coated optical fibers for use with a multi-fiber connector, the pitch conversion apparatus comprising:
   a base member having a first end and a second end, the base member including a separator mounting location adjacent the first end, the base member defining a recess in a top surface thereof;
   a separator element positioned at the separator mounting location of the base member, the separator element defining grooves to receive and sequence the plurality of coated optical fibers with respect to each other such that the plurality of coated optical fibers have a pitch diameter wherein the separator element is a screw with helical threads of uniform pitch, and wherein ridges form the continuous helical roll thread with a constant thickness; and
   a fiber holder positioned in the recess of the base member, the fiber holder including a clamp and a channel for receiving the plurality of coated optical fibers extending from the separator element;

wherein the plurality of optical fibers respectively positioned in the grooves of the separator element interface with the fiber holder such that when the clamp is rotated to a closed position, the clamp maintains the proper alignment of sequenced coated optical fibers extending from the separator element.

2. The pitch conversion apparatus of claim 1, further comprising spaces defined between the ridges of the separator element, the spaces having a width in an X direction.

3. The pitch conversion apparatus of claim 2, wherein the width defining the spaces is greater than the thickness of the ridges forming the continuous helical roll thread.

4. The pitch conversion apparatus of claim 3, wherein the width of each space between the ridges is between about 201 micrometers and about 203 micrometers.

5. The pitch conversion apparatus of claim 3, wherein the width of each space between the ridges is about 150 micrometers.

6. The pitch conversion apparatus of claim 4, wherein the plurality of coated optical fibers have a coating diameter of 200 micrometers, and wherein the thickness of each ridge of the separator element is about 50 micrometers to convert the 200 micrometer coating diameter of the plurality of coated optical fibers to a 250 micrometer pitch diameter so as to prepare the 200 micrometer coating diameter of the plurality of coated optical fibers for insertion into a 250 micrometer multi-fiber connector.

7. The pitch conversion apparatus of claim 4, wherein the plurality of coated optical fibers have a coating diameter of 200 micrometers, wherein the thickness of each ridge of the separator element is about 50 micrometers to convert the 200 micrometer coating diameter of the plurality of coated optical fibers to a 250 micrometer pitch diameter so as to prepare the 200 micrometer coating diameter of the plurality of coated optical fibers for use with a splicing apparatus.

8. The pitch conversion apparatus of claim 6, wherein the plurality of coated optical fibers have a coating diameter of at least 150 micrometers.

9. A pitch conversion apparatus for aligning a plurality of coated optical fibers for use with a multi-fiber connector, the pitch conversion apparatus comprising:
a base member having a first end and a second end, the base member including a separator mounting location adjacent the first end, the base member defining a recess in a top surface thereof;
a pin positioned at the separator mounting location of the base member, the pin defining grooves to receive and sequence the plurality of coated optical fibers with respect to each other having a pitch diameter, wherein the pin has a continuous helical roll thread of uniform pitch, and wherein ridges form the continuous helical roll thread with a thickness; and
a fiber holder positioned in the recess of the base member, the fiber holder including a clamp and a channel for receiving the plurality of coated optical fibers extending from the pin;
wherein the plurality of coated optical fibers respectively positioned in the grooves of the pin interface with the fiber holder such that the clamp maintains the proper alignment of sequenced coated optical fibers extending from the pin when the clamp is rotated to a closed position.

10. The pitch conversion apparatus of claim 9, wherein the plurality of coated optical fibers have a coating diameter of 200 micrometers, and wherein the thickness of each ridge of the separator element is about 50 micrometers to convert the 200 micrometer coating diameter of the plurality of coated optical fibers to a 250 micrometer pitch diameter so as to prepare the 200 micrometer coating diameter of the plurality of coated optical fibers for insertion into a 250 micrometer multi-fiber connector.

11. A pitch conversion apparatus for aligning a plurality of coated optical fibers for use with a multi-fiber connector, the pitch conversion apparatus comprising:
a base member having a first end and a second end, the base member including a separator mounting location adjacent the first end, the base member defining a recess in a top surface thereof;
a separator element positioned at the separator mounting location of the base member, the separator element defining grooves to receive and sequence the plurality of coated optical fibers with respect to each other such that the plurality of coated optical fibers have a pitch diameter;
a fiber holder positioned in the recess of the base member, the fiber holder including a clamp and a channel for receiving the plurality of coated optical fibers extending from the separator element; and
a clip pin that cooperates with a fiber holding segment of the base member to trap the plurality of coated optical fibers positioned on an upper surface of the fiber holding segment;
wherein the plurality of optical fibers respectively positioned in the grooves of the separator element interface with the fiber holder such that when the clamp is rotated to a closed position, the clamp maintains the proper alignment of sequenced coated optical fibers extending from the separator element.

* * * * *